United States Patent
Evans et al.

(10) Patent No.: US 10,940,648 B2
(45) Date of Patent: Mar. 9, 2021

(54) THREE DIMENSIONAL PRINTED FIBROUS INTERLOCKING INTERLAYERS

(71) Applicant: The Boeing Company, Chicago, IL (US)

(72) Inventors: Paul Evans, Essendon (AU); Christopher A. Howe, Albert Park (AU); Kariza Martin, Altona Meadows (AU); Thomas Wilson, Port Melbourne (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/364,606

(22) Filed: Mar. 26, 2019

(65) Prior Publication Data
US 2019/0322057 A1    Oct. 24, 2019

Related U.S. Application Data

(63) Continuation-in-part of application No. 15/957,071, filed on Apr. 19, 2018, now Pat. No. 10,562,262.

(51) Int. Cl.
| | | |
|---|---|---|
| B29C 70/24 | (2006.01) | |
| B29C 70/38 | (2006.01) | |
| B33Y 80/00 | (2015.01) | |
| B29L 31/30 | (2006.01) | |

(52) U.S. Cl.
CPC ............ B29C 70/24 (2013.01); B29C 70/386 (2013.01); B33Y 80/00 (2014.12); *B29L 2031/3076* (2013.01)

(58) Field of Classification Search
CPC .................................................... B29C 70/24

USPC ......................................................... 428/114
See application file for complete search history.

(56) References Cited

U.S. PATENT DOCUMENTS

| | | | |
|---|---|---|---|
| 4,001,366 A * | 1/1977 | Brumlik | A44B 18/0061 |
| | | | 264/147 |
| 7,981,495 B2 | 7/2011 | Kim et al. | |
| 9,845,556 B2 | 12/2017 | Meure et al. | |
| 10,081,722 B2 | 9/2018 | Meure et al. | |
| 2002/0112325 A1 | 8/2002 | Keohan et al. | |
| 2010/0065367 A1 | 3/2010 | Vermilyea et al. | |
| 2012/0156422 A1 | 6/2012 | Kozar et al. | |
| 2015/0024203 A1 | 1/2015 | Choi et al. | |
| 2016/0031182 A1 | 2/2016 | Quinn et al. | |
| 2016/0089853 A1 | 3/2016 | Meure et al. | |

(Continued)

FOREIGN PATENT DOCUMENTS

| | | |
|---|---|---|
| EP | 3000922 | 3/2016 |
| WO | 2017100783 | 6/2017 |

OTHER PUBLICATIONS

Extended European Search Report dated Oct. 4, 2019 for European Patent Application No. 19167994.3.

(Continued)

*Primary Examiner* — Brent T O'Hern
(74) *Attorney, Agent, or Firm* — Gates & Cooper LLP

(57) ABSTRACT

A three dimensional permeable thermoplastic tape useful for joining of layers of fiber tows (plies) together so as to form highly toughened resin infused structures. In one or more embodiments, the tape is manufactured using three dimensional printing and is applied between layers of fiber tows so as to tack the layers of fiber tows in place and prevent movement of the layers of fiber tows.

34 Claims, 30 Drawing Sheets

(56) References Cited

U.S. PATENT DOCUMENTS

2016/0114532 A1 4/2016 Schirtzinger et al.
2019/0322037 A1 10/2019 Howe et al.
2019/0322074 A1 10/2019 Howe et al.
2019/0322347 A1 10/2019 Howe et al.

OTHER PUBLICATIONS

Qin, Z., et al., "Structural optimization of 3D-printed synthetic spider webs for high strength", Nature Communications, May 2015, pp. 1-7, vol. 6.
Nguyen, A.T.T., et al., "Hierarchical surface features for improved bonding and fracture toughness of metal-metal and metal-composite bonded joints", International Journal of Adhesion & Adhesives, 2016, pp. 81-92, vol. 66.
Vaidya, U.K., et al., "Affordable Processing and Characterization of Multi-Functional Z-Pin Reinforced VARTM Composites", Proceedings of the 13th International Conference on Composite Materials, 2001, pp. 1-10.
Heimbs, S., et al., "Failure behaviour of composite T-joints with novel metallic arrow-pin reinforcement", Composite Structures, 2014, pp. 16-28, vol. 110.
PCT International Search Report and Written Opinion dated Oct. 7, 2019 for PCT Application No. PCT/US2019/026542.
Extended European Search Report dated Oct. 7, 2019 for European Patent Application No. 19170386.7.
Extended European Search Report dated Sep. 9, 2019 for European Patent Application No. 19170124.2.
PCT International Preliminary Report on Patentability (IPRP) dated Apr. 29, 2020 for PCT Application No. PCT/US2019/026542.

* cited by examiner

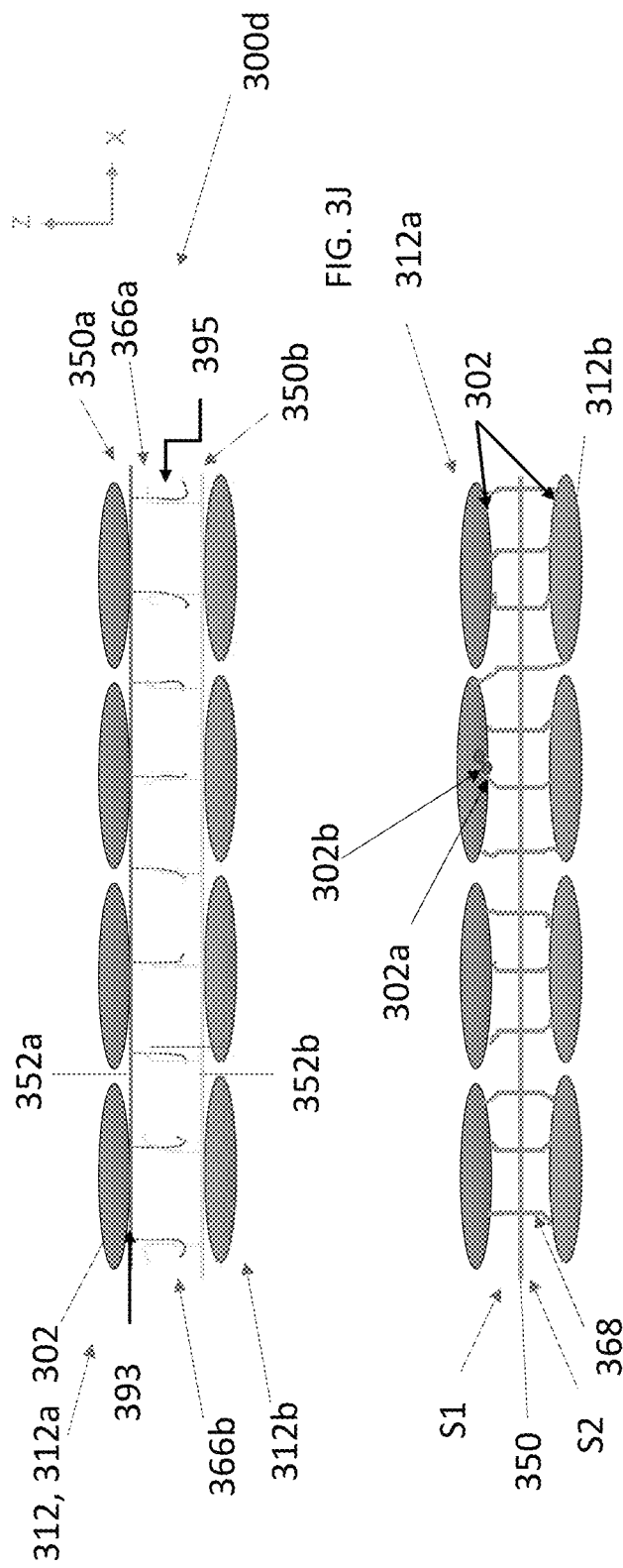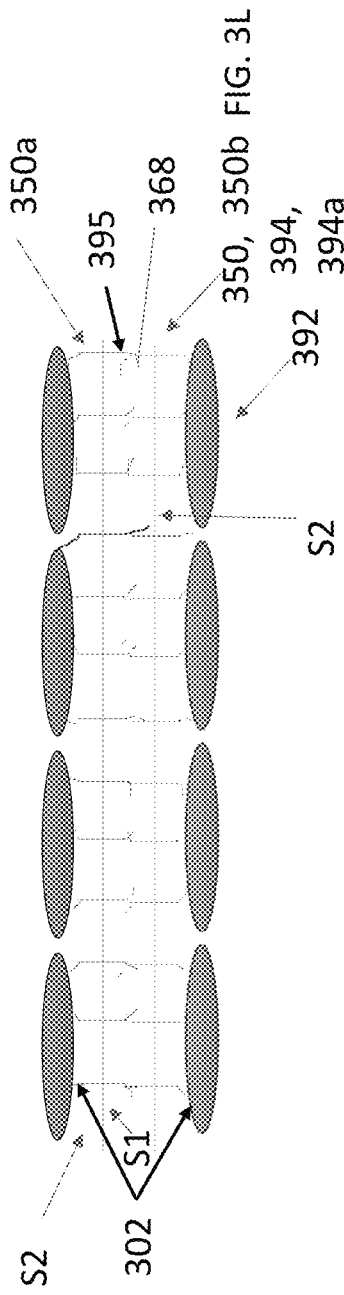

Print conditions: R0.5 and F500
Diameter: 150 μm
Length: 2.9 mm

Areal density 6 g/m²

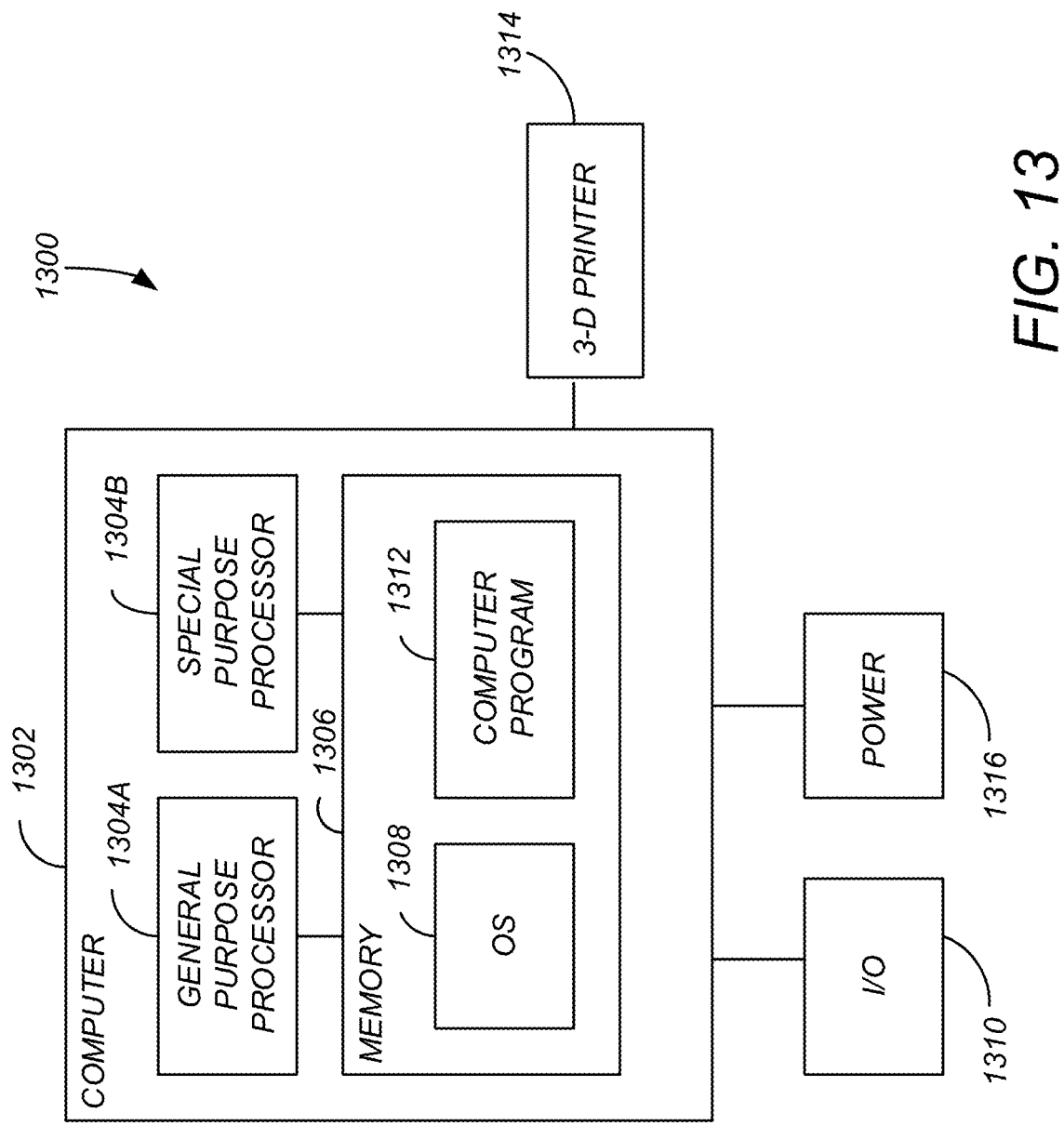

THREE DIMENSIONAL PRINTED FIBROUS INTERLOCKING INTERLAYERS

CROSS REFERENCE TO RELATED APPLICATIONS

This application is a continuation in part under 35 U.S.C. Section 120 of co-pending and commonly-assigned U.S. Utility patent application Ser. No. 15/957,071 filed Apr. 19, 2018 entitled "THERMOPLASTIC CELLULAR NETWORK TOUGHENED COMPOSITES," Attorney's Docket No. 147.304-US-U1 (17-2193-US-NP), which application is incorporated by reference herein.

BACKGROUND

1. Field

The present disclosure describes novel composite structures and methods of fabricating the same.

2. Description of the Related Art

Composite materials including layers of fiber tows are replacing metals as structural materials because of their light weight, relative strength, and their ability to be molded into more complex shapes. However, conventional structures comprising composite materials including fiber tows can exhibit cracking (in particular delaminations) under stress.

Conventional composite material toughening techniques in the form of interlayers (such as thermoplastic veils and particles) exhibit limited effectiveness in controlling failure at high stress concentration regions. In many cases, a toughened film adhesive is required to achieve the required through thickness toughness properties and mechanical fasteners may be the default for an acceptable design. This is particularly a concern for integrated aircraft structures where areas of high stress (100) occur throughout the structure thickness (such as at a joint radius, see FIG. 1). Therefore, a crack (102) that develops at the joint radius would only need to jump to an un-toughened layer for brittle failure to occur. Although such cracking might be mitigated using a through thickness toughening technique, conventional through thickness methods (such as film adhesives) are not employed in liquid molded structures due to disruption of the resin flow path during infusion, leading to defects such as voids, porosity and dry spots. Such defects significantly lower in-plane properties of the composite material's laminate structure.

Examples of through thickness techniques and their constraints are listed below:

Z-pins: used for stacked reinforcements through the layers of fiber tows but microstructural imperfections may occur during the insertion process.

Stitches: used for toughening dry fiber preforms including layers of fiber tows but microstructural imperfections may occur occur during the insertion process.

Three dimensional (3D) woven/3D knitted/3D braided preforms including layers of fiber tows that are typically applied with liquid molding methods. However, due to fiber tow misalignment within the 3D preform caused during the manufacturing processes, these preforms may be limited to specific geometries.

FIG. 2 shows an Ashby plot characterizing conventional veil, stitch and z-pinned toughened composite materials and highlights the gap where in plane properties have been measured as Open Hole Compression (OHC) strength versus Mode I Interlaminar Fracture Toughness (Gic). FIG. 2 shows that through thickness methods significantly increase mode I fracture toughness compared to veils and that an increase up to 1400% is possible with z-pins. However, through thickness reinforcements reduce compressive properties in terms of OHC strength and other in-plane properties due to the microstructural imperfections induced during their manufacturing process. Veils applied as interlayers, on the other hand, show a lower reduction in OHC, where less disruption to the fiber tows is caused during the application of veil to the preform including the fiber tows. However, the effective improvement in Gic is not sufficient for some applications. Thus, the gap representing performance that has not been conventionally achieved is obtaining a high mode I fracture toughness without degradation of in-plane properties using continuous through thickness reinforcements.

What is needed, then, is a through thickness technique that is continuous through the composite material and does not reduce in-plane properties. Embodiments of the present invention satisfies this need.

SUMMARY

The present disclosure describes a tape comprising a three dimensional network including a two dimensional grid attached to a plurality of pillars. The three dimensional network can be embodied in many ways including, but not limited to, the following examples.

1. A tape comprising the two dimensional grid including a first set of first filaments and a second set of second filaments, wherein the first set of first filaments are aligned in a first direction and the second set of second filaments are aligned in a second direction so as to intersect with the first set of the first filaments; and a plurality of pillars extending (e.g., upwards or downwards) from the two dimensional grid so that the first set of first filaments, second set of second filaments, and the plurality of pillars form the three dimensional network.

2. The tape of embodiment 1, wherein the three dimensional network comprises a veil interlayer.

3. The tape of embodiments 1 or 2, wherein the three dimensional network is a three dimensional interlayer between layers of a laminate.

4. The tape of embodiment 3, wherein the layers are adjacent layers in the laminate, the plurality of the pillars extend to a maximum distance from the two dimensional grid, the maximum distance is measured in a direction perpendicular to the two dimensional grid, and the maximum distance is less than the spacing from the two dimensional grid to a bottom (closest surface) of the one of the adjacent layers.

5. The tape of embodiment 3, wherein the layers are adjacent layers in the laminate, the plurality of pillars extend to a maximum distance from the two dimensional grid, the maximum distance is measured in a direction perpendicular to the two dimensional grid, and the maximum distance is equal to a spacing from the two dimensional grid to a top (furthest surface from the two dimensional grid) of the one of the adjacent layers, so that the tips of the pillars are even with the top of the one of the layers.

6. The tape of embodiment 3, wherein the layers are adjacent layers in the laminate, the plurality of pillars extend to a maximum distance from the two dimensional grid, the maximum distance is measured in a direction perpendicular to the two dimensional grid, and the maximum distance is greater than the spacing from the two dimensional grid to a top (surface furthest from the two dimensional grid) of the one of the adjacent layers, so that the pillars extend through and above the one of the adjacent layers.

7. The tape of one or any combination of embodiments 1-6 having one or any combination of the following dimensions:
the pillars having a height H in a range of 0.3 millimeter (mm)≤H≤5 mm.
the pillars extending from the two dimensional grid have a spacing $S_E$ between adjacent pillars in a range of 0.8 mm≤$S_E$≤5 mm.
a spacing $S_h$ between adjacent first filaments in the first set of filaments is 0.8 mm≤$S_h$≤5 mm.
a spacing $S_v$ between adjacent second filaments in the second set of filaments is 0.8 mm≤$S_v$≤5 mm.
the pillars having an average diameter $E_d$ in a range 0.02 mm≤$E_d$≤1 mm.
the first filaments in the first set and the second filaments in the second set independently having a diameter Ed in a range 0.04 mm≤d≤2 mm.

8. The tape of one or any combination of embodiments 1-7, wherein the two dimensional grid comprises a mesh including pores bounded by the first filaments and the second filaments, wherein the pores comprise between 40-80% of a surface area of the mesh so as to facilitate resin infusion into the tape.

9. The tape of one or any combination of embodiments 1-8, wherein the pillars are inclined at an angle in a range from zero to five degrees, wherein the angle is between a line, passing through a base of the pillar and a tip of the pillar, and a direction perpendicular to the two dimensional grid.

10. The tape of one or any combination of embodiments 1-9, wherein the pillars extend (e.g., upwards or downwards) from the intersections between the first filaments and the second filaments.

11. The tape of one or any combination of embodiments 1-10, wherein the pillars extend (e.g., upwards or downwards) from the first filaments or second filaments at a location between the intersections between the first filaments and the second filaments.

12. The tape of one or any combination of embodiments 1-11, wherein the pillars are configured to hook onto the pillars extending from a second two dimensional grid in a second tape, so as to join the tape to the second tape.

13. The tape of one or any combination of embodiments 1-12, wherein the first filaments, the second filaments, and/or the pillars comprise material used for e.g., additive manufacturing, including, but not limited to, a thermoplastic, such as polyamide, polyetherketone (PEK), polyether ether ketone (PEEK), polyetherketoneketone (PEKK), polyimide (PI), polyetherimide (PEI) polyphenylsulphone, or hybrid forms of the aforementioned thermoplastics with modifiers and/or inclusions such as a carbon nanotube, graphene, a clay modifier, discontinuous fibers, surfactants, stabilizers, powders and particulates.

14. The tape of one or any combination of embodiments 1-13, wherein the pillars comprise drawn material.

15. The tape of one or any combination of embodiments 1-14, wherein the first filaments, the second filaments, and/or the pillars comprise a thermoplastic or a hybrid of the thermoplastic.

16. The tape of one or any combination of embodiments 1-15, wherein the pillars extend from a first side of the tape and a second side of the tape.

17. A composite article, comprising a first tape including a first two dimensional grid including a first set of first filaments and a second set of second filaments, wherein the first set of first filaments are aligned in a first direction and the second set of second filaments are aligned in a second direction so as to intersect with the first set of first filaments; and a first plurality of pillars extending (e.g., upwards or downwards) from the first two dimensional grid. The composite article further includes a second tape including a second two dimensional grid including a third set of third filaments and a fourth set of fourth filaments, wherein the third set of third filaments are aligned in a third direction and the fourth set of fourth filaments are aligned in a fourth direction so as to intersect with the third set of the third filaments; and a second plurality of pillars extending (e.g., upwards or downwards) from the second two dimensional grid, wherein each of the first plurality of pillars are hooked onto one of the second plurality of pillars.

18. The composite article of embodiment 17, further comprising a layer of fiber tows between the first tape and the second tape, wherein the first plurality of the first pillars extend to a maximum distance above or below the first two dimensional grid, the maximum distance is measured in a direction perpendicular to the first two dimensional grid, and the maximum distance is less than the spacing from the first two dimensional grid to a bottom of the layer closest to the first two dimensional grid.

19. The composite article of embodiment 17, further comprising a layer of fiber tows between the first tape and the second tape, wherein the first plurality of the pillars extend to a maximum distance above or below the first two dimensional grid, the maximum distance is measured in a direction perpendicular to the first two dimensional grid, and the maximum distance is equal to a spacing from the first two dimensional grid to a top of the layer furthest from the first two dimensional grid so that the tips of the first plurality of the pillars are even with the top of the layer.

20. The composite article of embodiment 17, further comprising a layer of fiber tows between the first tape and the second tape, wherein the first plurality of the first pillars extend to a maximum distance above or below the first two dimensional grid, the maximum distance is measured in a direction perpendicular to the first two dimensional grid, and the maximum distance is greater than the spacing from the first two dimensional grid to a top (surface of the layer furthest from the two dimensional grid) of the layer, so that the first plurality of the pillars extend through and above the layer.

21. An integrated aircraft structure comprising the composite article of embodiment 16, further comprising a skin attached to the first tape; a stiffener attached to the second tape; and resin filling pores in the two dimensional grids.

The present disclosure further describes a method of making a composite article. The method can be embodied in many ways including but not limited to, the following examples.

22. The method comprising positioning a layer of fiber tows between a plurality of tapes including a first tape and a second tape, wherein each tape includes a two dimensional grid including a first set of first filaments and a second set of second filaments, wherein the first set of first filaments are aligned in a first direction and the second set of second filaments are aligned in a second direction so as to intersect with the first set of the first filaments; and a plurality of pillars extending from the two dimensional grid so that the first set of first filaments, second set of second filaments, and the plurality of pillars form a three dimensional network; and the pillars of the first tape pass into spaces between the fiber tows.

23. The method of embodiment 22 wherein the positioning further comprises laying the layer on the first tape so that the pillars of the first tape pass through the spaces between the fiber tows of the layer; and positioning the second tape on the layer so that the pillars of the second tape hook onto portions of the pillars of the first tape that have passed through the spaces.

24. The method of embodiment 23, wherein the layer is one of a plurality of the layers each comprising the fiber tows and the positioning further comprises sequentially laying each of the plurality of the layers on the first tape so that: a plurality of the different spaces between the fiber tows in each of the layers are stacked above one another and form a plurality of stacked openings through all the layers, and the pillars of the first tape extend through or into the stacked openings; and positioning the second tape on the layers so that the pillars of the second tape hook onto portions of the pillars of the first tape that have passed through or into the stacked openings.

25. The method of embodiment 24, wherein the layers comprise a first layer and a second layer; the pillars of the first tape have a first length passing into the stacked openings, through the first layer and into the second layer, and the pillars of the second tape have a second length passing into the stacked openings and through the second layer, but the second length is too short to reach the first layer.

26. The method of one or any combination of embodiments 22-25, wherein the pillars include first pillars extending from a first side of the two dimensional grid and second pillars extending from a second side of the two dimensional grid.

27. The method of embodiment 26, wherein the tapes include a third tape, the method further comprising positioning an additional layer comprising the fiber tows on the second tape, wherein the second pillars of the second tape extend towards the layer and the first pillars of the second tape extend towards the additional layer; and laying a third tape on the additional layer so that the second pillars in the third tape hook onto the first pillars extending from the second tape, wherein the second pillars in the third tape and/or the first pillars in the second tape pass into or through the spaces between the fiber tows in the additional layer.

28. The method of embodiment 27, wherein the layer is in a first component of an article of manufacture and the additional layer is in a second component of the article of manufacture.

29. The method of embodiment 27, wherein the first component is a stiffener of an integrated aircraft structure and the second component is a skin of the integrated aircraft structure.

30. The method of one or any combination of embodiments 22-29, further comprising applying resin into each of a plurality of pore spaces between the first filaments, the second filaments, and the pillars in the three dimensional network.

31. A method of making a composite article, comprising attaching a plurality of tapes including a first tape and a second tape, wherein the first tape is attached to a first component and the second tape is attached to a second component, and each tape includes: a two dimensional grid including a first set of first filaments and a second set of second filaments, wherein the first set of first filaments are aligned in a first direction and the second set of second filaments are aligned in a second direction so as to intersect with the first set of the first filaments; and a plurality of pillars extending from the two dimensional grid so that the first set of first filaments, second set of second filaments, and the plurality of pillars form a three dimensional network; wherein attaching the first tape to a first component; and positioning the first tape and the second tape so that the pillars of the first tape hook onto the pillars in the second tape.

32. The method of embodiment 31, wherein the first component includes a first plurality of layers and the second component includes a second plurality of layers, each of the layers comprising fiber tows.

33. The method of embodiments 31 or 32, wherein the pillars include first pillars extending from a first side of the two dimensional grid and second pillars extending from a second side the two dimensional grid, the plurality of tapes include a third tape and a fourth tape, the first component includes the third tape and the second component includes the fourth tape, the first pillars in the first tape hook onto the second pillars of the second tape, the second pillars in the first tape pass into or extend towards spaces between the fiber tows in one of the first plurality of the layers and hook onto the pillars of the third tape, and the first pillars in the second tape pass into or extend towards spaces between the fiber tows in one of the second plurality of the layers and hook onto the pillars of the fourth tape.

34. The method of one or any combination of embodiments 31-33, wherein the first component is a stiffener and the second component is a skin in an integrated aircraft structure.

BRIEF DESCRIPTION OF THE DRAWINGS

Referring now to the drawings in which like reference numbers represent corresponding parts throughout:

FIG. 3J illustrates a single sided tape accompanied with melt bonding, according to one or more embodiments.

FIG. 3K illustrates a double sided tape with pure mechanical bonding, according to one or more embodiments.

FIG. 3L illustrates double sided tapes with pure mechanical bonding, according to one or more embodiments.

FIG. 13 illustrates a processing environment for controlling a 3D printer according to embodiments described herein.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

I. Example Structures a. Networks

The present disclosure reports on a tape comprising a three dimensional 3D network of filaments and pillars. In one or more embodiments, the tape is combined with fiber tows in a composite material so as to enhance toughness of the composite material by causing cracks to deflect as they encounter walls in the 3D network without degrading the integrity of the composite material, thus demonstrating clear advantageous properties over thermoplastic veils and conventional through thickness techniques. Specifically, through thickness methods induce microstructural defects during the manufacturing process and thermoplastic veils have limited toughening effectiveness.

Figure 3A:
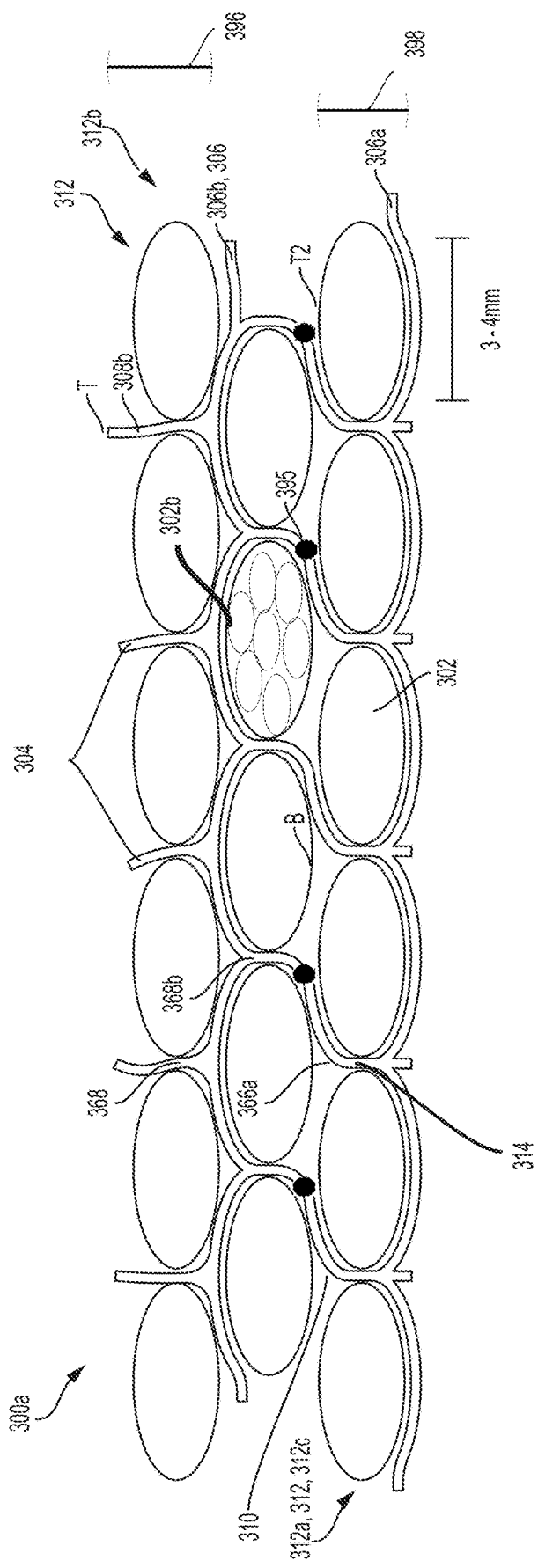
FIG. 3A illustrates a three dimensional (3D) network combined with fiber tows according to one or more embodiments described herein.

FIG. 3A illustrates an example composite article (300a) comprising a plurality of the fiber tows (302) intermingled or combined with a network (304) comprising filament layers 306 connected by drawn material (308b) comprising pillars (368). The filament layers 306 comprise a first filament layer 306a and a second filament layer 306b and each of a plurality of the pillars (368) are drawn from the first filament layer (306a) and pass through a different space (310) between the fiber tows (302) so as to connect the first filament layer (306a) to the second filament layers (306b).

The network (304) comprising the drawn material (308b) and filament layers (306) forms a physical barrier reducing propagation of cracks (interlaminar, intralaminar, and/or translaminar cracks) in the composite article (300a). In various examples, the drawn material (308b) is inclined between the filament layers (306) so as to form a non-uniform geometry that increases the surface area of the drawn material (308b) and creates a more tortuous pathway for the cracks.

In one or more examples, the fiber tows (302) separated by spaces (310) are disposed in layers 312 (e.g., comprising a ply 312c), wherein the layers 312 comprise a first layer 312a and a second layer 312b. Each of the layers 312 (e.g., first layer 312a) of fiber tows 302 are between two of the filament layers 306 connected by the pillars (368) so that the plurality of the pillars (368) drawn from the first filament layer (306a) pass through the different spaces (310) in the first layer 312a of fiber tows (302) between first filament layer (306a) and the second filament layer (306b). In one or more embodiments, the fiber tows 302 each comprise reinforcement fibers 302b.

The pillars 368 comprise a first plurality 366a of the pillars 368 extending from the first filament layer 306a and forming an interlock 395 with a second plurality 366b of the pillars extending from the second filament layer 306b.

In the example shown, the plurality 366a, 366b of the pillars 368 extend to a maximum distance 396 from the filament layer 306, measured in a direction perpendicular to the filament layer 306, wherein the maximum distance 396 is greater than the spacing 398 from the filament layer 306 to a top T2 of the one of the adjacent layers 312 of fiber tows 302, so that the pillars extend through the layer 312 of fiber tows. The top T2 is a surface of the first layer 312a furthest from the first filament layer 306a). In other examples, the maximum distance 396 is less than the spacing 398 from the filament layer 306 to a bottom B of the one of the adjacent layers 312, wherein the bottom is a surface of the first layer 312a closest to the first filament layer 306a. In yet another example, the maximum distance 396 is equal to a spacing from the filament layer 306 to a top T2 of the one of the adjacent layers 312 of fiber tows, so that the tips T of the pillars 368 are even with the top T2 of the one of the layers 312 of fiber tows 302.

In one or more embodiments, the drawn material (308b), the filament layers (306) of the network (304), and the pillars 368 are created using a 3D printer; however the process is not 3D printing in the traditional sense as the pillars (368) are not created layer by layer. The 3D printer is instead used as a tool to deposit controlled amounts of material (314) onto a layer 312 of fiber tows 302 in the x-y plane and then the tool uses the plasticity of the material (314) to pull the material (314) in a vertical direction.

Figure 3B:
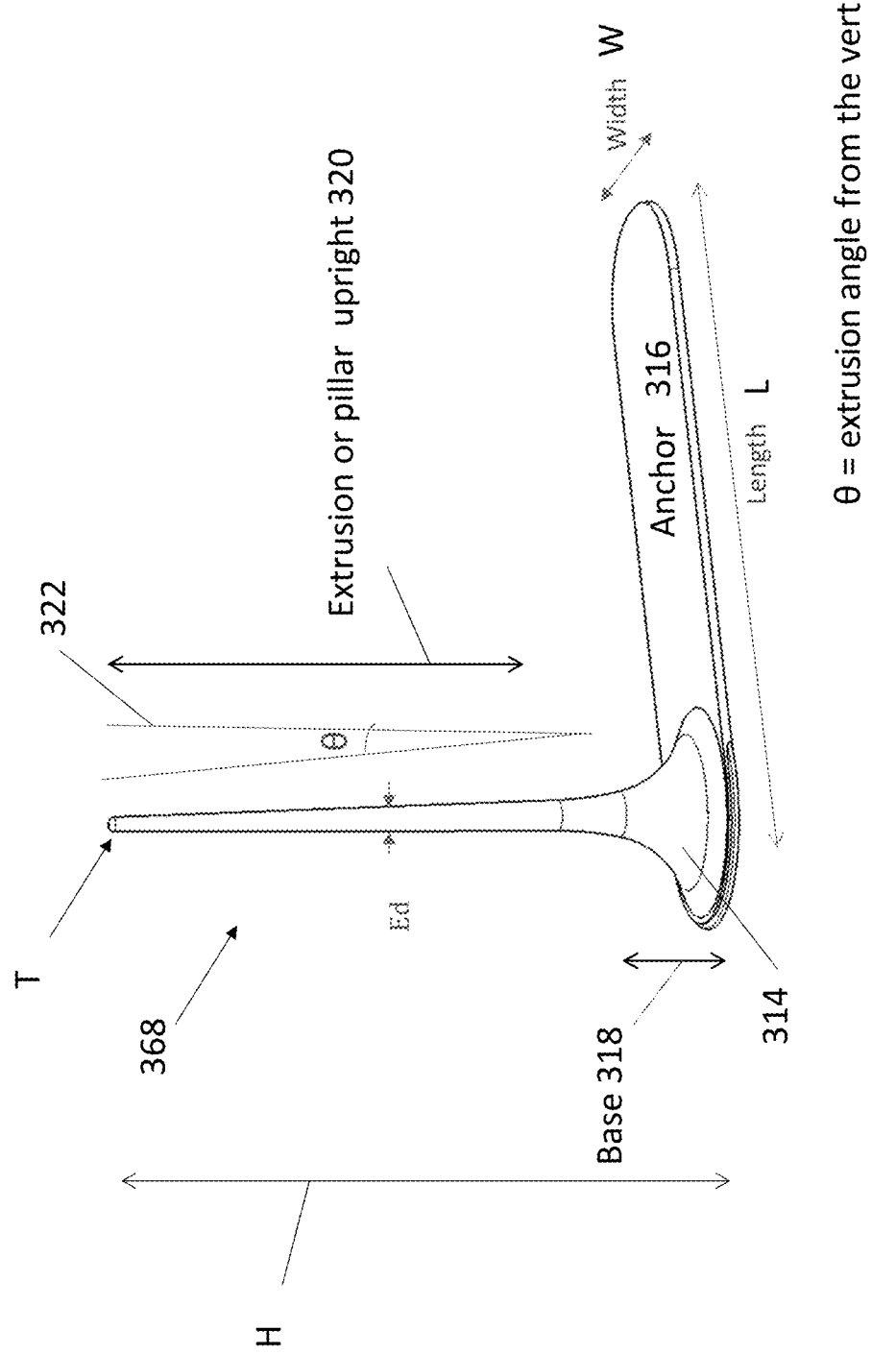
FIG. 3B illustrates material deposited in the 3D network includes an anchor, an upright, and a base.

FIG. 3B illustrates an example wherein the tool used to fabricate the network (304) uses the plasticity of the material (314) to pull the material (314) in a vertical direction to form thin upright strands or pillars (368) having a height H. Thus, the deposited material (314) is drawn from an anchor (316) (having width W and length L) and forms a pillar (368) including a base (318) (e.g., extrusion base) and an upright (320) (e.g., extrusion), the upright (320) having an average diameter $E_d$ along the upright (320) and an angle θ with respect to a vertical direction (322). In one example, material (314) is also fed or deposited during the pulling to form the pillar (368). The process conditions during deposition or pulling of the material (314) may be controlled to obtain various shapes for the pillar (368). In one or more examples, the base (318) on the anchor (316) is thicker than the upright (320) portion of the pillar (368). In one or more examples, the upright (320) has varying diameter in a range of 0.13 mm≤$E_d$≤0.23 mm. In one or more examples, the upright (320) is conical or tapered or has a constant diameter.

Figure 3D:
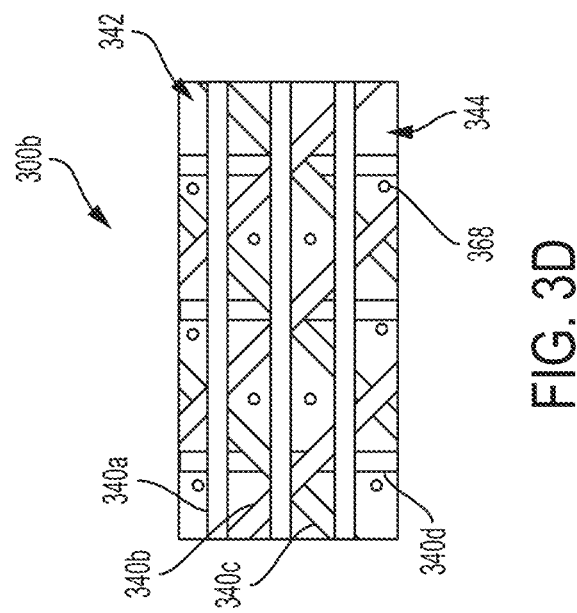
FIG. 3D is a top view of FIG. 3C.
Figure 3C:
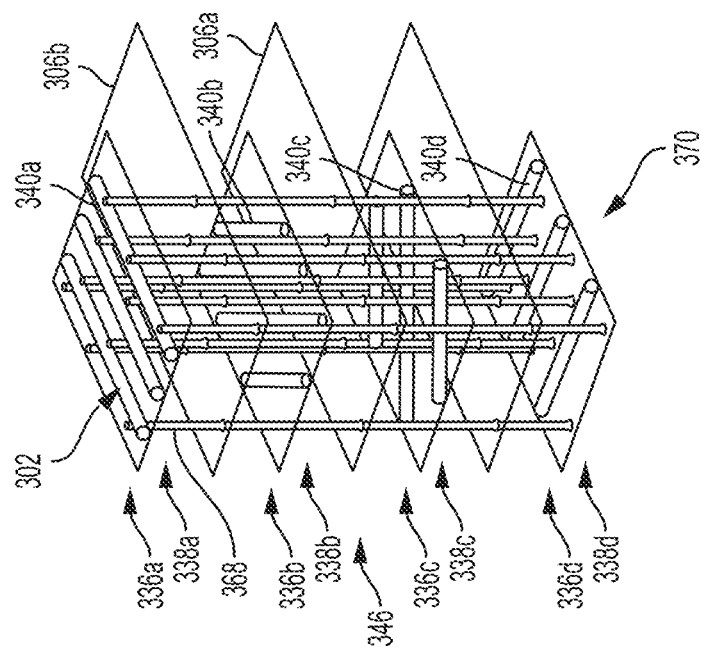
FIG. 3C illustrates an embodiment wherein spaces are defined by fiber tows in different layers.

FIGS. 3C and 3D illustrate examples wherein the layers (338a, 338b, 338c, 338d) comprise a stack of plies (336a, 336b, 336c, 336d) in the composite article (300b), and the layers (338a, 338b, 338c, 338d) each comprise different orientations (370) of (e.g., unidirectional) fiber tows (340a, 340b, 340c, 340d). In this case, spaces (342) or pores (344) are created through a plurality of the layers (338a, 338b, 338c, 338d) or plies (336a, 336b, 336c, 336d) and the spaces (342) or pores (344) are bounded, defined, or walled by the fiber tows (340a, 340b, 340c, 340d) in different plies (336a, 336b, 336c, 336d) or different layers (338a, 338b, 338c, 338d).

The plies (336a, 336b, 336c, 336d) or layers (338a, 338b, 338c, 338d) that lie in different planes (346) comprise fiber tows (340a, 340b, 340c, 340d) aligned or oriented at different angles with respect to each other so as to define the pores (344) or spaces (342). In one example wherein the layers (338a, 338b, 338c, 338d) comprise mats, the fiber tows (302) in each pair of adjacent layers (338a, 338b, 338c, 338d) are at 90 degrees to one another and are woven together. However, in other examples, the fiber tows (340a, 340b, 340c, 340d) can be oriented at any angle (e.g., 45 degrees) with respect to each other. In one or more examples, the height H (see FIG. 3B) of the pillar (368) is a function of how many layers (338a, 338b, 338c, 338d) or plies (336a, 336b, 336c, 336d) define the pores (344) or spaces (342). In one or more examples, the spaces (342) between the fiber tows (340a, 340b, 340c, 340d) are in an intermediate layer (338b) between the fiber tows (340a, 340c).

Figure 3E:
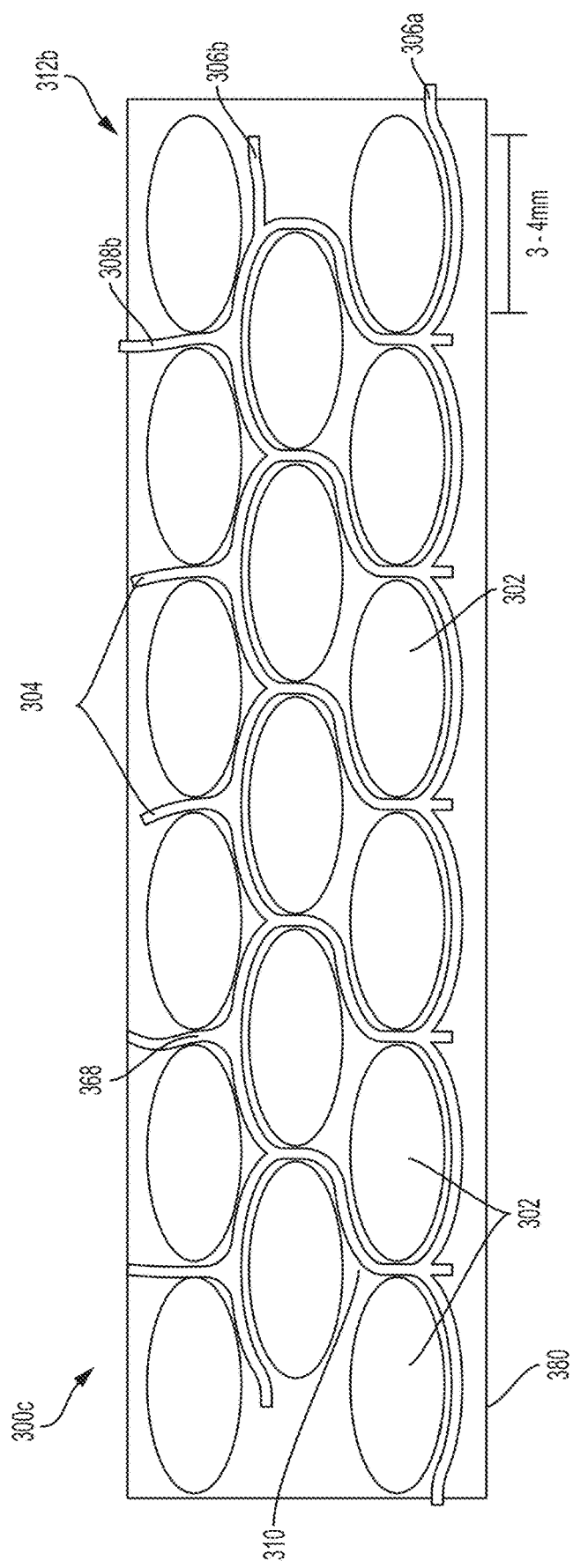
FIG. 3E illustrates an embodiment wherein a resin is combined with the composite.

FIG. 3E illustrates a composite article (300c) including a resin (380) combined with the layers (312) of fiber tows 302 and the drawn material (308b) comprising pillars 368.

b. Tape

Figure 3F:
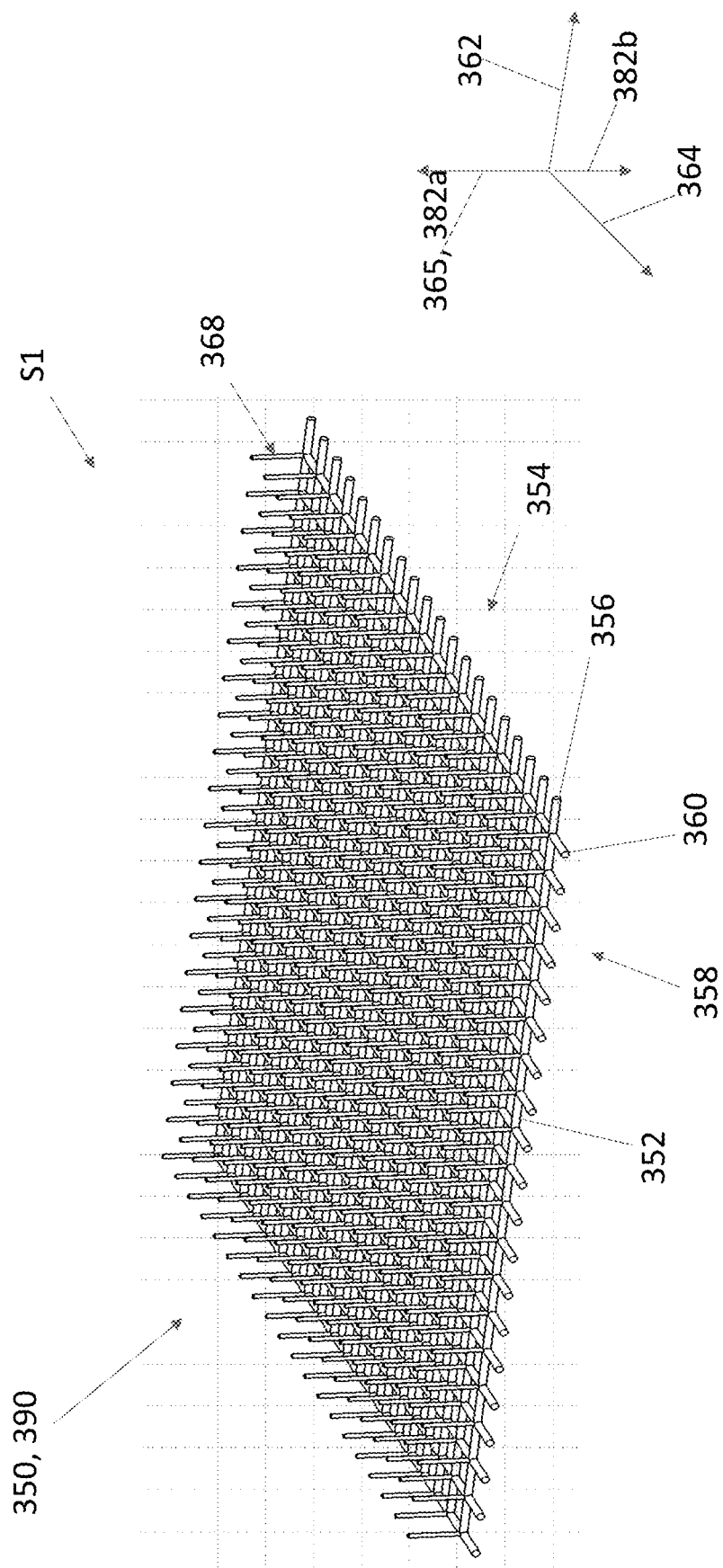
FIG. 3F illustrates a single sided 3D printed tape (e.g., in the form of a permeable veil interlayer) that can be disposed in a continuous roll or tape format and that contains a pattern of pillars oriented in the out-of-plane (otherwise known as the z-plane), according to one or more embodiments.
Figure 3G:
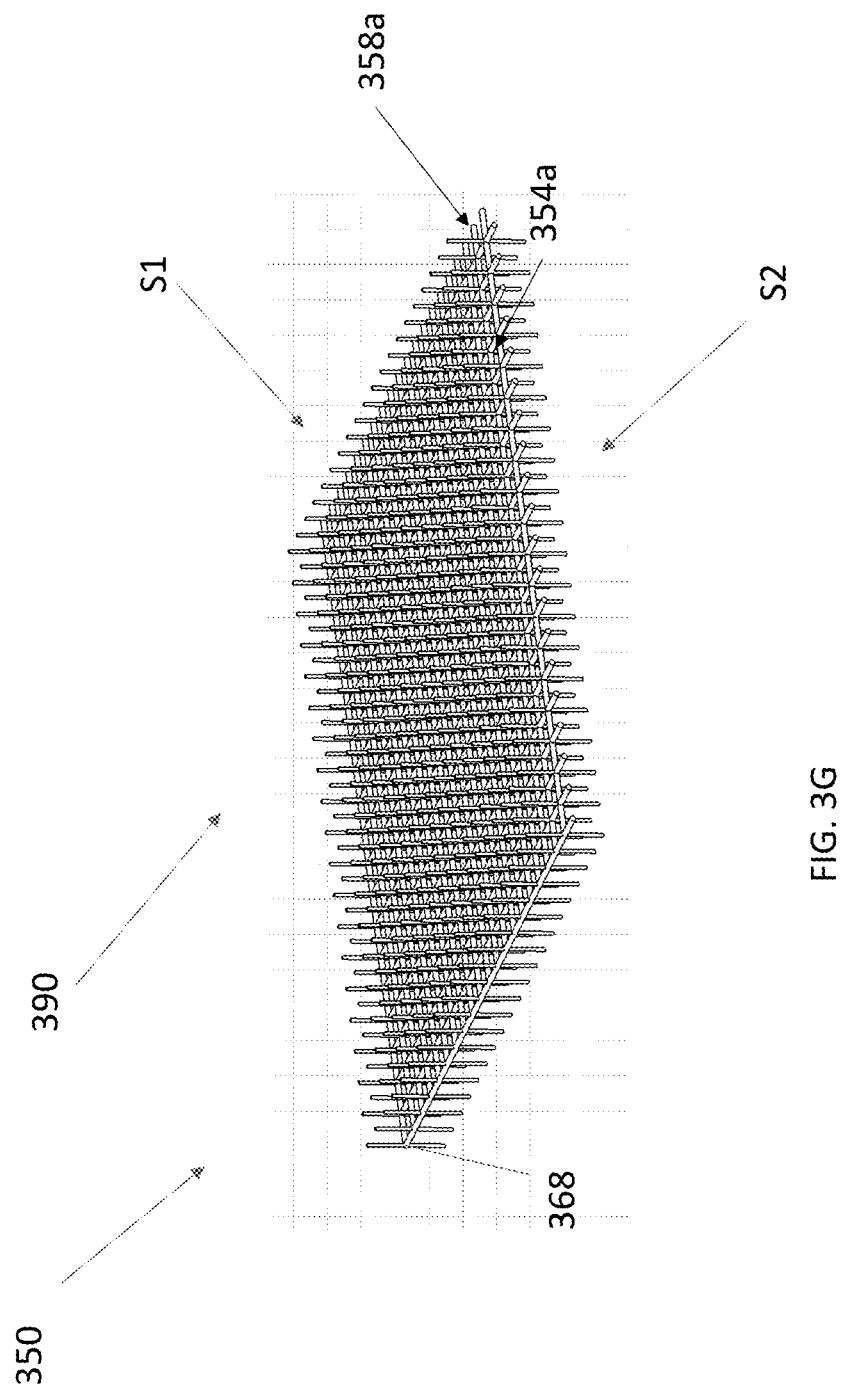
FIG. 3G illustrated a double sided 3D printed tape (e.g., in form of a permeable veil interlayer) that can be disposed in a continuous roll or tape format, that contains a pattern of pillars oriented in the out-of-plane (otherwise known as the z-plane), according to one or more embodiments.

FIGS. 3F-3I illustrate a tape 350, comprising a two dimensional grid 352 including filaments 355 (a first set 354 of first filaments 356 and a second set 358 of second filaments 360), wherein the first set 354 of first filaments 356 are aligned in a first direction 362 (e.g., x-direction) and the second set 358 of second filaments 360 are aligned in a second direction 364 (e.g., y-direction) so as to intersect with the first set 354 of the first filaments 356. The tape 350 further includes a plurality of pillars 368 extending in an out of plane direction 365 (e.g., upwards 382a or downwards 382b e.g., in a z-direction) from the two dimensional grid 352 so that the first set 354 of first filaments 356, second set of second filaments 360, and the plurality of pillars 368 form a three dimensional network 390. FIG. 3F illustrates a single sided embodiment comprising pillars 368 extending (e.g., upwards) from a first side S1 of the two dimensional grid 352 and FIG. 3G illustrates a double sided embodiment comprising pillars 368 extending from a first side S1 and a second side S2 of the two dimensional grid 352. In various examples, the filament layers 306 comprise the two dimensional grid 352.

Figure 3H:
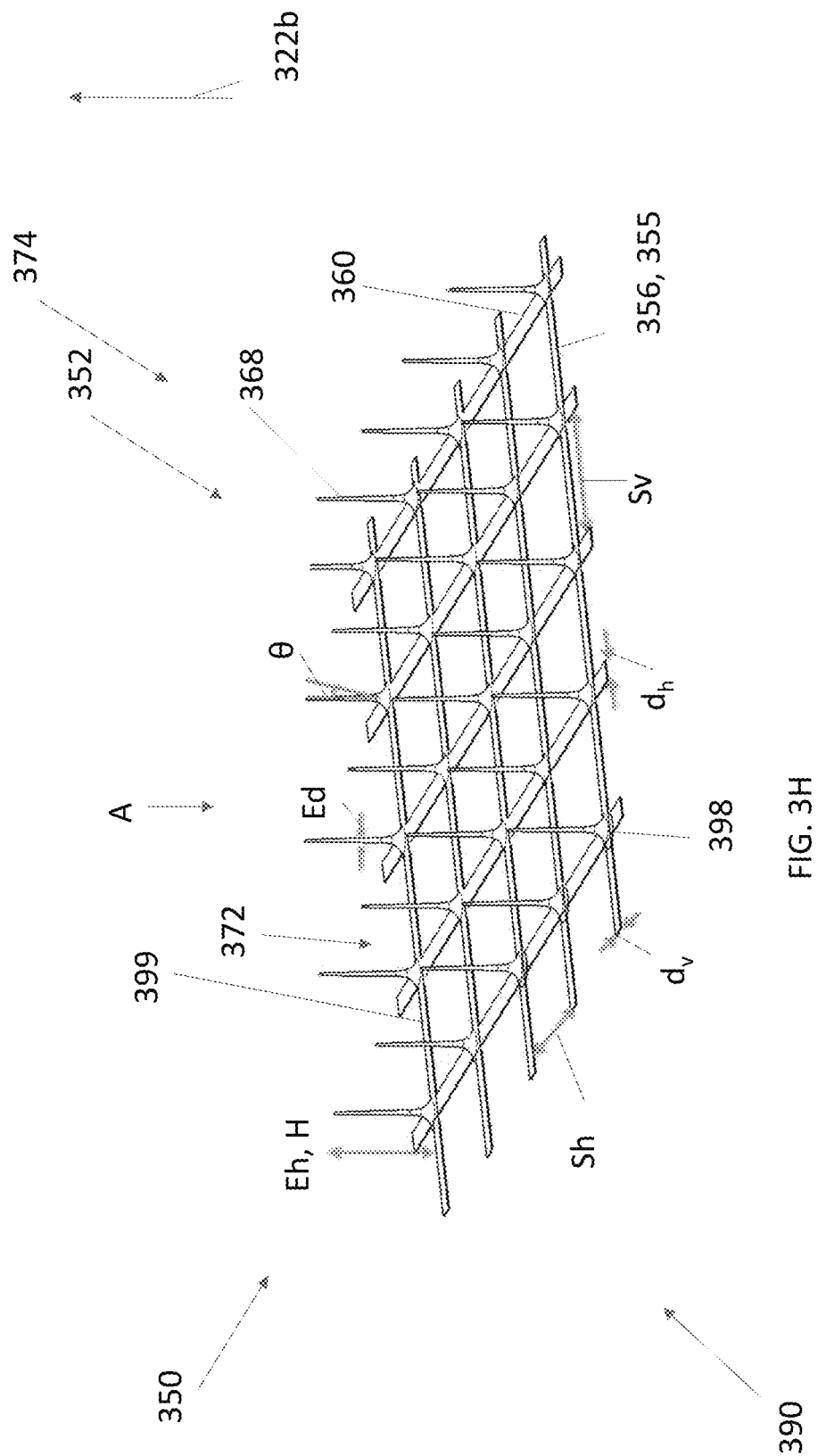
FIG. 3H illustrates key geometric features of z-plane short fibers and pattern the arrangement with a base, according to one or more embodiments.
Figure 3I:
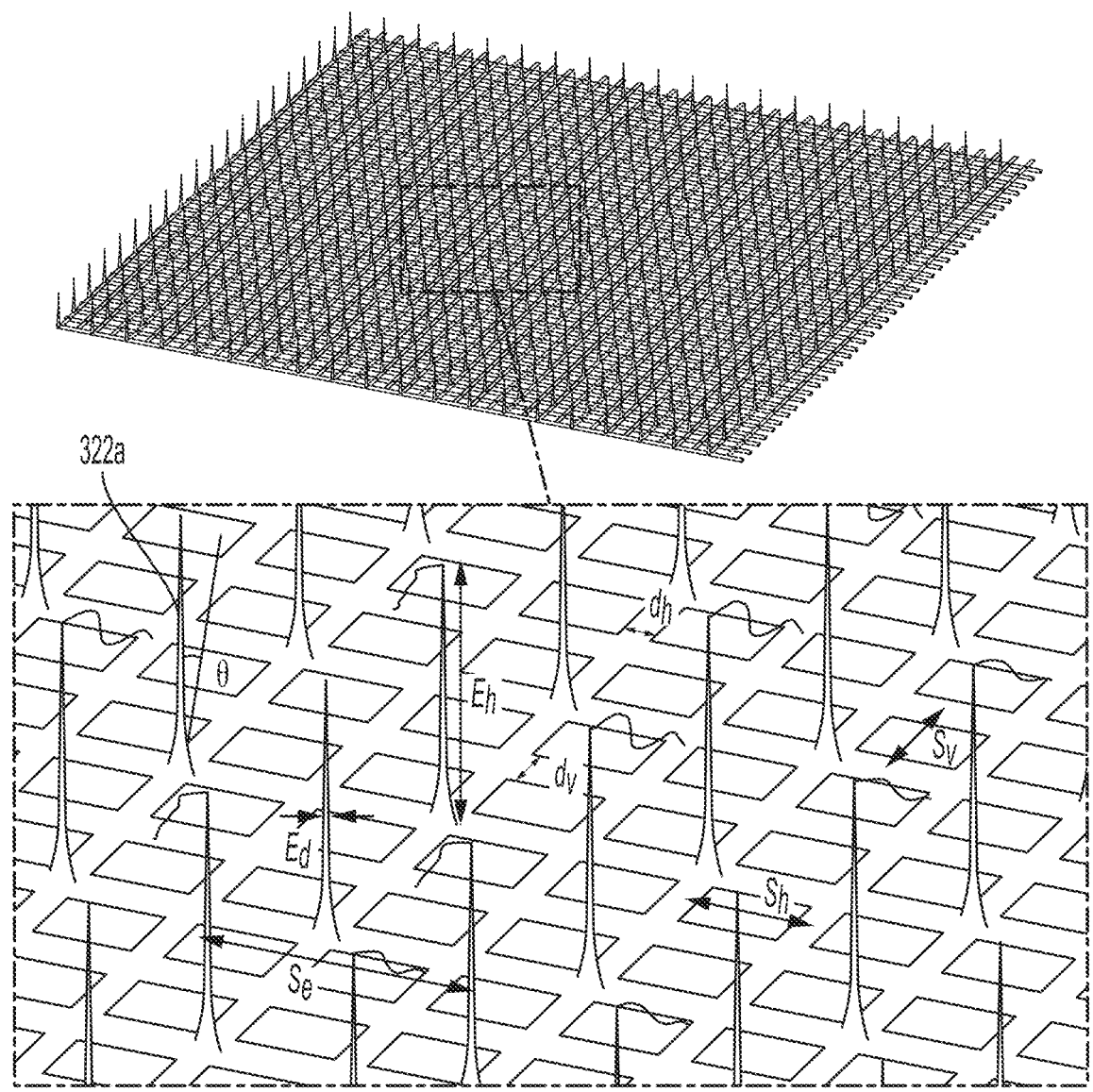
FIG. 3I illustrates various example parameters used in the fabrication of the tape.

FIGS. 3H-3I illustrate parameters such as pattern and arrangement of the pillars 368 (e.g., z-plane short fibers), the height, diameter, surface texture and spacing of the pillars, and the base (e.g., two dimensional grid 352) upon which the pillars 368 are built, can be selected depending on a desired application or property of the tape. As illustrated in FIG. 3H and FIG. 3I, the parameters include, but are not limited to, a height H, Eh of the pillars, a spacing Sh of the first set 354 of first filaments 356, a spacing $S_V$ of the second set 358 of second filaments 360, a width $d_v$ of the first filaments 356 in the first set, a width $d_h$ of the second filaments 360 in the second set, an average diameter Ed of the pillars, an angle θ of the pillar along a line 322a with respect to a direction 322b perpendicular to the two dimensional grid 352, a surface area A of the two dimensional grid 352 or mesh 374 comprising the first filaments 356 and the second filaments 360, and a location 399 of the pillars 368 relative to intersections 398a between the first filaments 356 and the second filaments 360.

TABLE 1

Example parameters

| | |
|---|---|
| θ = Extrusion angle from vertical | 0° ≤ θ ≤ 5° |
| $E_h$ = Extrusion height | 0.3 mm ≤ $E_h$ ≤ 5 mm |
| $S_E$ = Extrusion spacing | 0.8 mm ≤ $S_E$ ≤ 5 mm |
| $S_h$ = Horizontal spacing between in-plane fibers | 0.8 mm ≤ $S_h$ ≤ 5 mm |
| $S_v$ = Vertical spacing between in-plane fibers | 0.8 mm ≤ $S_v$ ≤ 5 mm |
| $E_d$ = Extrusion Average diameter | 0.02 mm ≤ $E_d$ ≤ 1.0 mm |
| $d_v$ = Diameter of vertical in-plane fibers | 0.04 mm ≤ $d_v$ ≤ 2 mm |
| $d_h$ = Diameter of horizontal in-plane fibers | 0.04 mm ≤ $d_h$ ≤ 2 mm |

TABLE 2

Further Example parameters

| | |
|---|---|
| θ = Extrusion angle from vertical | 0° ≤ θ ≤ 5° |
| $E_h$ = Extrusion height | 0.5 mm ≤ $E_h$ ≤ 5 mm |
| $S_E$ = Extrusion spacing | 1.5 mm ≤ $S_E$ ≤ 5 mm |
| $S_h$ = Horizontal spacing between in-plane fibers | 1.5 mm ≤ $S_h$ ≤ 5 mm |
| $S_v$ = Vertical spacing between in-plane fibers | 1.5 mm ≤ $S_v$ ≤ 5 mm |
| $E_d$ = Extrusion Average diameter | 0.05 mm ≤ $E_d$ ≤ 0.23 mm |
| $d_v$ = Diameter of vertical in-plane fibers | 0.4 mm ≤ $d_v$ ≤ 2 mm |
| $d_h$ = Diameter of horizontal in-plane fibers | 0.4 mm ≤ $d_h$ ≤ 2 mm |

Further examples include, but are not limited to, selecting the parameters so as to achieve one or more of the following.

1. A controlled "pore space" enabling for resins and gases to pass through. The pore space (see FIG. 3H) is a pore 372 comprising the volumetric free space between the first filaments 356, second filaments 360, and pillars 368 and that is intended to be filled by resin. In one or more examples the pores 372 are bounded by the first filaments 356 and the second filaments 360 and comprise between 40-80% of a surface area A of the two dimensional grid 352 comprising a mesh 374 so as to facilitate resin infusion into the tape 350. In other examples, the pore 372 is defined by a spacing $S_h$ between adjacent first filaments 356 (e.g., 2 mm≤$S_h$≤5 mm) and a spacing $S_v$ between adjacent second filaments 360 (e.g., 2 mm≤$S_v$≤5 mm).

2. The tape 350 having a base comprising the two dimensional grid 352 that is permeable but has sufficient flexibility to form a tape or roll product form.

4. The first filaments 356, second filaments 360, and pillars 368 forming a continuous three dimensional network 390 around the fiber tows 302 in all directions including the z-direction, not just in a two dimensional grid 352 forming an x-y plane interlayer region between the fiber tows 302.

3. The three dimensional network 390 comprising a permeable veil three dimensional interlayer comprising the two dimensional grid 352 in combination with the pillars 368, wherein the pillars 368 are disposed as a pattern of short fibers oriented out of the plane of the two dimensional grid 352 so that the pillars are oriented in, or have a component in, the z-plane when the two dimensional grid 352 is oriented in an x-y plane.

5. Layers 312 of fiber tows 302 readily tacked or joined together at room temperature ambient conditions using the three dimensional network 390.

6. The three dimensional network 390 providing for a reduction or prevention of damage to the layers 312 of fiber tows 302, the reinforcement fibers 302b in the fiber tows 302, wherein the damage includes damage that would otherwise be caused by through thickness insertion of stitched or pins through the layers 312. Thus, in one or more examples, the three dimensional network 390 achieves significant through thickness toughening (e.g., through the layers 312) without sacrificing in-plane properties (such as open hole compression strength) of the composite article (300a).

7. The plurality of pillars 368 forming an ordered architecture, the two dimensional network 352 of first filaments and second filaments forming a permeable base for the pillars, and wherein the pillars and/or the two dimensional grid are fabricated using additive manufacturing technology.

9. The pillars 368 comprising a controlled architecture enabling entanglement of the pillars 368 when the faces or sides of two or more three dimensional networks 390 (comprising three dimensional interlayers) meet, as illustrated in FIG. 3J, thus creating a joining mechanism e.g., between layers 312 of fiber tows 302. More specifically, FIG. 3J (referring also to FIGS. 3F and 3G) illustrates a composite article 300d comprising tapes 350, the tapes 350 comprising a first tape 350a connected to a second tape 350b. The first tape 350a includes a first two dimensional grid 352a including a first set of first filaments 356 and a second set of second filaments 360, wherein the first set 354 of first filaments 356 are aligned in a first direction 362 and the second set 358 of second filaments 360 are aligned in a second direction 364 so as to intersect with the first set of the first filaments 356; and a first plurality 366a of pillars 368 extending (e.g., upwards or downwards) from the two dimensional grid 352a. The second tape 350b includes a second two dimensional grid 352b including a third set of third filaments 356a and a fourth set of fourth filaments 360a, wherein the third set of third filaments 356a are aligned in a third direction and the fourth set of fourth filaments 360a are aligned in a fourth direction so as to intersect with the third set of the third filaments 356a; and a second plurality 366b of pillars 368 extending (e.g., upwards or downwards) from the second two dimensional grid, wherein each of the first plurality 366a of pillars 368 are interlocked 395 with (e.g., hooked onto, entangled with, wrapped onto or twisted with, or intertwined with) one of the second plurality 366b of pillars 368.

10. FIG. 3J illustrates a single sided tape example wherein the first plurality 366a of pillars 368 of a first tape 350a interlock 395 with the second plurality 366b of pillars 368 of the second tape 350b, the first two dimensional grid 352a in the first tape 350a is bonded 393 (e.g., melt bonded or glued with adhesive) to fiber tows 302 in the first layer 312a of fiber tows 302, and the second two dimensional grid 352b in the second tape 350a is bonded 393 (e.g., melt bonded or glued with adhesive) to fiber tows 302 in the second layer 312b of fiber tows. In one or more examples, the two dimensional grid 352 in each tape 350 (first tape 350a comprising first two dimensional grid 352a and second tape 350b comprising second two dimensional grid 352b) is melt bonded onto the fiber tows 302 at specific locations and the two dimensional grid 352 is thicker than the pillars 368 for connecting strength so as to form an effective melt bond (i.e., $E_d < d_h$ and $d_v$ of first filaments 356 and second filaments 360) because more material 314 is needed to form the melt bond than the interlock 395 between the pillars 368. In some embodiments, the melt bond is achieved by heating (e.g., with a heat gun or oven) the two dimensional grid 352 placed on the fiber tows 302 so as to locally melt or soften the first filaments 356 and the second filaments 360 in the two dimensional grid 352 and promote or increase bonding of the first filaments 356 and second filaments 360 to the fiber tows 302 at a plurality of melt bond locations. In one or more examples, the thinner the two dimensional grid 352 (smaller $d_h$ and $d_v$), the more melt bond locations between the two dimensional grid 352 and the fiber tows 302 are required because the strength of each melt bond is proportional to the amount of material in the two dimensional grid 352 that is melted to form the melt bond.

FIG. 3K illustrates a tape 350 example comprising a double sided tape including pillars 368 extending (e.g., upwards) from a first side S1 of the two dimensional grid 352 and pillars 368 extending (e.g., downwards) from a second side S2 the two dimensional grid 352. In the example shown, a tape 350 comprising a single double sided tape is between a first layer 312a of fiber tows 302 and a second layer 312b of fiber tows 302. The pillars 368 on the first side S1 interlock 302a with (e.g., hook onto or entangle with) the fiber tows 302 (or reinforcement fibers 302b in the fiber tows 302) in the first layer 312a, and the pillars 368 on the second side S2 of the tape 350 interlock with (e.g., hook onto or entangle with) the fiber tows 302 (or reinforcement fibers 302b in the fiber tows) in the second layer 312b. In one or more embodiments, the pillars 368 interlock 302a mechanically (e.g., through physical or frictional contact between the pillars 368 and the fiber tows 302) without melt bonding or adhesive between the pillar 368 and the fiber tows 302. In one or more examples, the two dimensional grid 352 and the pillars 368 of the tape 350 are thick enough (i.e., diameters $d_v$ and $d_h$ of first filaments 356 and the second filaments 360 are large enough) for connecting strength but the pillars 368 can be made slightly thinner than the two dimensional grid 352 (i.e., $Ed < d_h$ and $d_v$) because strain applied between a layer 312 of fiber tows 302 and the two dimensional grid 352 is divided through a sufficiently large number of pillars 368 that the strain per pillar 368 can be sustained by pillars 368 that are thinner than the first filaments 356 and the second filaments 360. However, in one or more embodiments, the diameters Ed of the pillars 368 that interlock with the fiber tows 302 without melt bonding are thicker than in the embodiments that include melt bonding or adhesive between the tape 350 and the fiber tows 302 (FIG. 3J), because the pillars 368 that interlock without melt bonding or adhesive must accommodate more strain per pillar.

FIG. 3L illustrates an embodiment comprising two tapes 350 (first tape 350a and second tape 350b that are each double sided tapes) between a first layer 312a of fiber tows and a second layer 312b of fiber tows, wherein the pillars extending from a first side S1 of the first tape 350a interlock with (e.g., hook onto) the pillars 368 extending from the second side S2 of the second tape 350b. The pillars extending from the second side S2 of the first tape 350a interlock with (e.g., hook onto) the fiber tows 302 (e.g., reinforcement fibers 302b in the fiber tows) in a first layer 312a and the pillars extending from the first side S1 of the second tape 350b interlock 302a with (e.g., hook onto) the fiber tows 302 (e.g., reinforcement fibers 302b in the fiber tows) in the second layer 312b. In one or more embodiments, the pillars 368 interlock 302a mechanically (e.g., through physical or frictional contact) with other pillars 368 or the reinforcement fibers in the fiber tows without melt bonding or adhesive. However, the two dimensional grid 352 and pillars 368 can be made thinner (i.e., Ed, $d_h$, and $d_v$ are thinner) than in the embodiments that (1) use a tape 350 comprising a single double sided tape between the first layer 312a and the second layer 312b (as illustrated in FIG. 3K); or (2) use a first tape 350a interlocked with a second tape 350b between a first layer 312a and a second layer 312b of (FIG. 3J)—because the use of two tapes 350 that are each double sided tapes increases the number of interlocks 395, 302a (between the pillars and between the pillars and the layers of fiber tows) thereby reducing the strain being supported per pillar. In one or more embodiments, the layers 312 comprise layers of a laminate 392 and the first tape 350a and/or the second tape 350b comprise a three dimensional network forming a veil interlayer 394 or a 3D interlayer 394a.

Thus, when multiple tapes 350 are applied, a three dimensional network 390 entangled with layers 312 of fiber tows is created wherein the pillars 368 from one tape 350 entangle with (e.g., hook onto) the pillars 368 of an adjacent tape 350. This resulting three dimensional network 390 is formed around multiple layers 312 of fiber tows 302 without damaging or distorting reinforcement fibers 302b in the fiber tows 302. Not only does the controlled architecture of the pillars 368 hooking onto each other provide a sufficient bond to hold the layers 312 of fiber tows in place (e.g., at room temperature), but the hooking also creates a three dimensional network 390 of first filaments 356, second filaments 360 and pillars 368 around the fiber tows 302 in a laminate 392 so as to toughen the laminate 392.

Examples of the material used to fabricate the first filaments 356 and second filaments 360 in the two dimensional grid 352 and/or the pillars 368 (e.g., z-directional fibers) include, but are not limited to, a material used in additive manufacturing (e.g., a polymer). The polymer may comprise a thermoplastic, such as polyamide, polyetherketone (PEK), polyether ether ketone (PEEK), polyetherketoneketone (PEKK), polyimide (PI), polyetherimide (PEI) polyphenylsulphone, or hybrid forms of the aforementioned thermoplastics with modifiers and/or inclusions such as a carbon nanotube, graphene, a clay modifier, discontinuous fibers, surfactants, stabilizers, powders and particulates.

In exemplary embodiments, the fiber tows 302 comprise bundles of reinforcement fibers 302b. In various examples the reinforcement fibers 302b comprise at least one material chosen from fiberglass, kevlar, carbon, and thermoplastic.

In one or more examples, the fiber tows 302 are woven or arranged into a braided fabric, a woven fabric, or a non-crimp fabric, or fibrous portion. In other embodiments, the fiber tows are arranged in unidirectional tape with slits or gaps (comprising parallel tows with gaps there between), braids, or multi-axial reinforcements.

In one or more embodiments, the layers 312 of fiber tows 302 each comprise a ply in a preform (e.g., a preformed component of an aircraft or other structure), so that the preform comprises a plurality of the layers (plies) of fiber tows and one or more tapes 350 fastening the layers 312 together. The fiber tows 302 can be configured so as to form the layer 312 comprising a mat. In one or more embodiments, the layers 312 of fiber tows are considered (e.g., dry fiber) reinforcements in the preform and the layers 312 of fiber tows can be further fastened using resin 380.

Figure 3M:
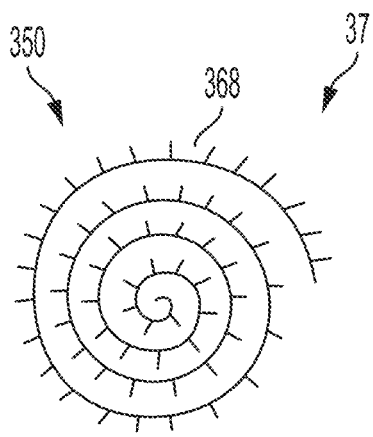
FIG. 3M illustrates a cross-sectional view of a tape disposed in a roll, according to one or more embodiments.

FIG. 3M illustrates a roll 37 comprising the tape 350 or the tape disposed in a roll 37.

II. Example Manufacturing Methods a. Architecture Fabrication

Figure 4:
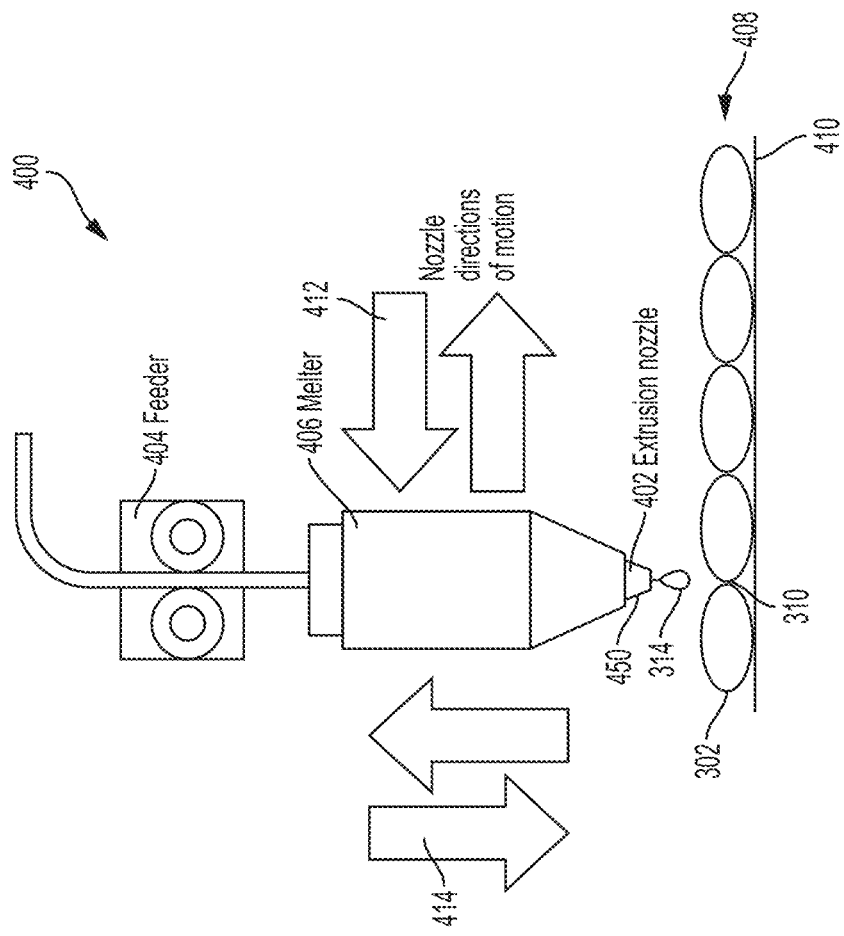
FIG. 4 illustrates an exemplary three dimensional (3D) printer that can be used to manufacture the composite articles described herein.

FIG. 4 illustrates an exemplary 3D printer 400 comprising an outlet (450) (e.g., extrusion nozzle (402)) a feeder (404), and a melter (406) for feeding material (314) (e.g., onto a first layer 312a comprising a base layer (408) of fiber tows), and a platform (410) (e.g., print bed or base) for supporting the tape 350 and/or layers 312 while the material (314) is deposited. Example printers 400 include, but are not limited to, a desktop Fused Deposition Modeling (FDM) 3D printer. In one or more examples, the 3D printer is controlled by software executing a computer program. The platform (410) and/or the nozzle (402) are moved so that the nozzle (402) and the tape 350/layer 312 can be moved relative to one another in an x-y plane (412) and vertically up or down in a z-direction (414).

Figure 5:
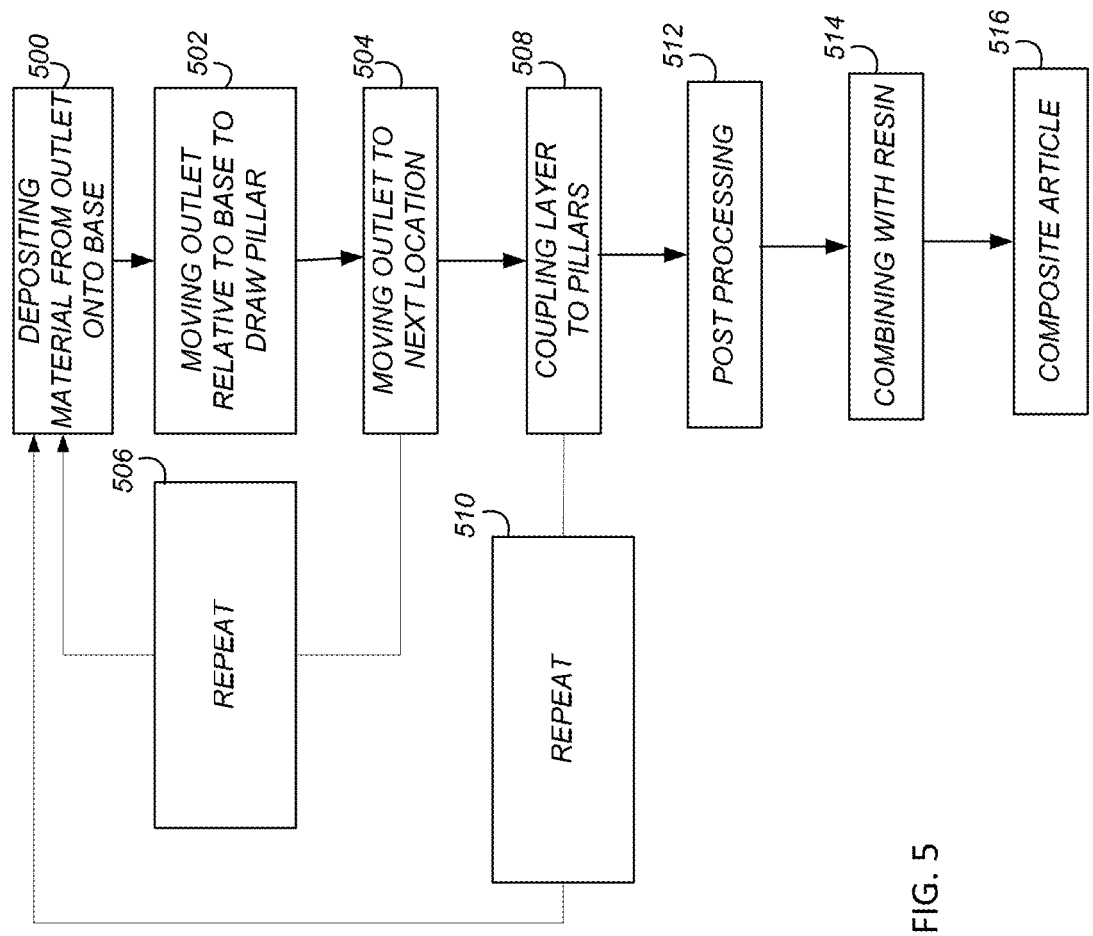
FIG. 5 is a flowchart illustrating a method of fabricating a composite article according to one or more embodiments.

The 3D printer can be used to control morphology of the deposited material so that key elements of the deposited material include the anchor (316), base (318) and upright (320), and if necessary, the two dimensional grid 352 upon which the anchor 316, the base 318, and the upright 320 are formed. In one or more examples, the process for combining the tape 350 comprising the three dimensional network (390) and the layers (312) of fiber tows 302 proceeds as illustrated in FIG. 5.

Block 500 represents depositing material from an outlet (450) onto the base layer (408) or the platform while moving the outlet and the base layer (408)/platform relative to one another, first in an x-y plane (412) and then in a z-direction (414), so as to form the first set of first filaments 356 and second set of second filaments 360 into a two dimensional grid 352 and/or form the anchor (316) on the two dimensional grid 352 at a first location.

Figure 7A:
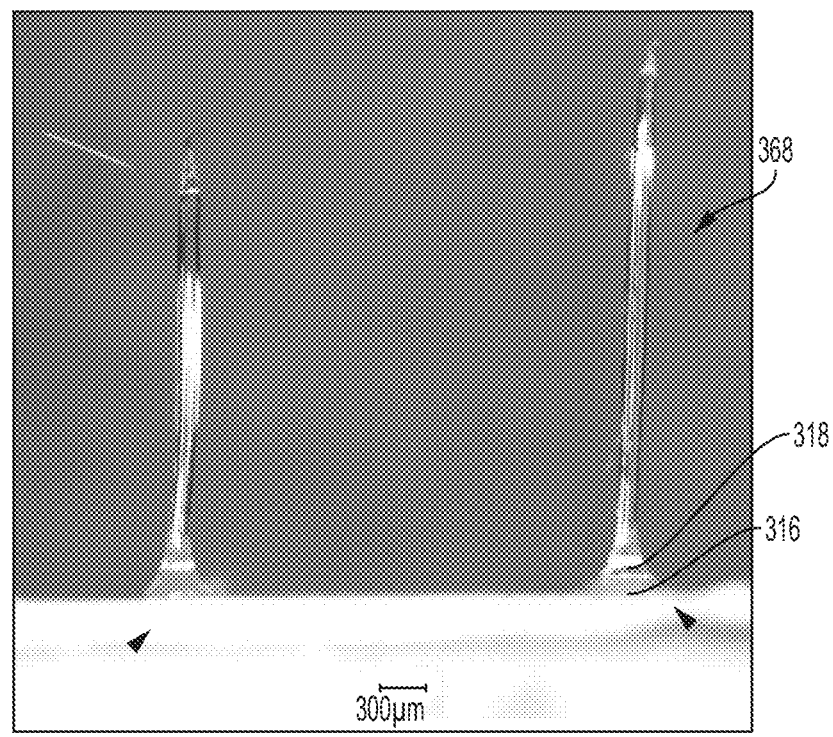
FIG. 7A illustrates exemplary pillars or fibers drawn from an anchor using print conditions of filament feed rate R=0.5 revolutions per minute and nozzle speed F=500 mm/min_ have a diameter of 150 micrometers, a length of 2.9 mm, and an areal density of 6 g/m².
Figure 7B:
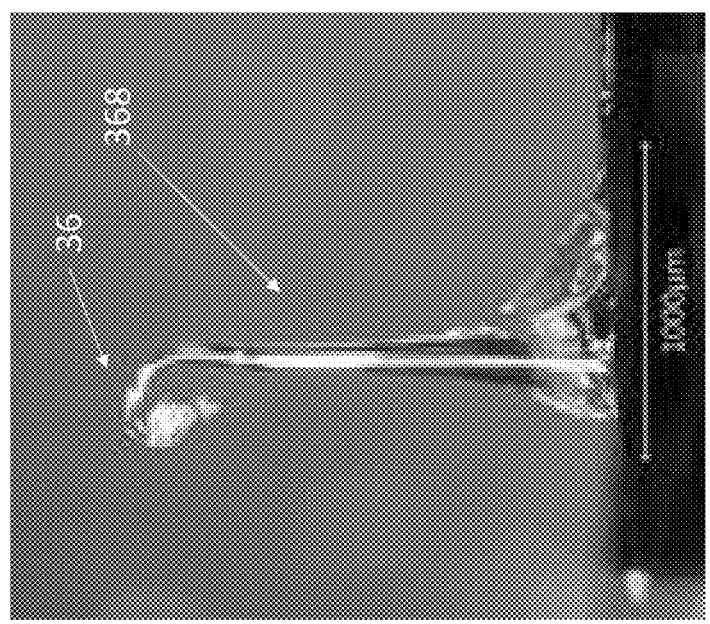
FIG. 7B illustrates a pillar having a hook (e.g., a swan neck shaped hook) according to one or more examples.

Block 502 represents moving the outlet (450) and the platform (410) relative to one another with or without feed of the material (314) from the outlet (450), so that a portion of the anchor (316) is drawn to create a pillar (368). In one example, the step comprises the nozzle (402) pulling or moving up in a z-direction (414) a predetermined distance (e.g., 5 mm) with feed of material or with the feed rate turned off (no feed of the material (314) from the nozzle (402)) and using the stringiness from the material (314) in the anchor (316) to create the uprights (320) forming the pillars 368 in the z-direction. FIG. 7A illustrates how a portion of the anchor (316) is pulled upwards to create the pillar 368. FIG. 7B illustrates a pillar 368 having an end including a hook 36 (e.g., a swan neck shaped hook). In one or more examples, the hook 36 is used to anchor one layer 312 (e.g., ply) of fiber tows 302 to another layer 312 (e.g., ply) of fiber tows 302.

Block 504 represents moving the outlet (450) and the base layer (408)/platform relative to one another so that the outlet (450) is positioned above a next location on the base layer (408) or platform (410).

Block 506 represents repeating steps in Blocks 500-504 so as to create the tape 350 comprising a plurality of the pillars 368 on the two dimensional grid 352, which may optionally also be on the base layer (408).

Figure 6A:
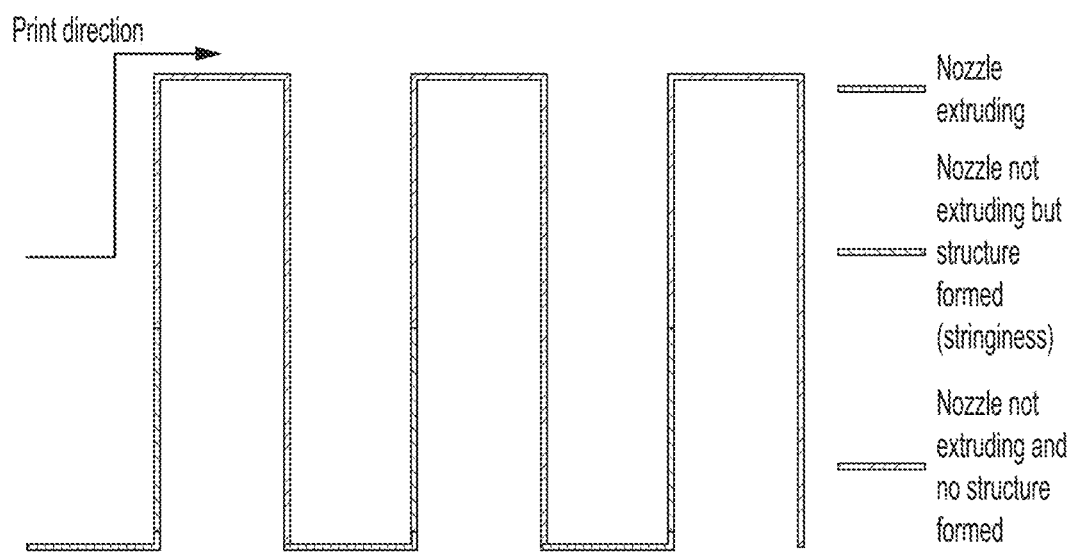
FIG. 6A illustrates an exemplary trajectory for the nozzle during deposition of a cellular network, according to one or more embodiments.

FIG. 6A illustrates an exemplary trajectory for the nozzle 402 for formation of the pillars 368, according to one or more embodiments, showing periods when the nozzle is extruding as the nozzle moves in the x-y plane, periods when the nozzle is not extruding but a structure (e.g., pillar 368) is formed by moving the nozzle 402 in a z-direction, and periods where the nozzle is not extruding and no structure is formed (e.g., between pillars 368). In one or more examples, material (314) is also fed, deposited, or expelled from the nozzle during periods when the nozzle is pulling or extruding to form the pillar 368.

Figure 6B:
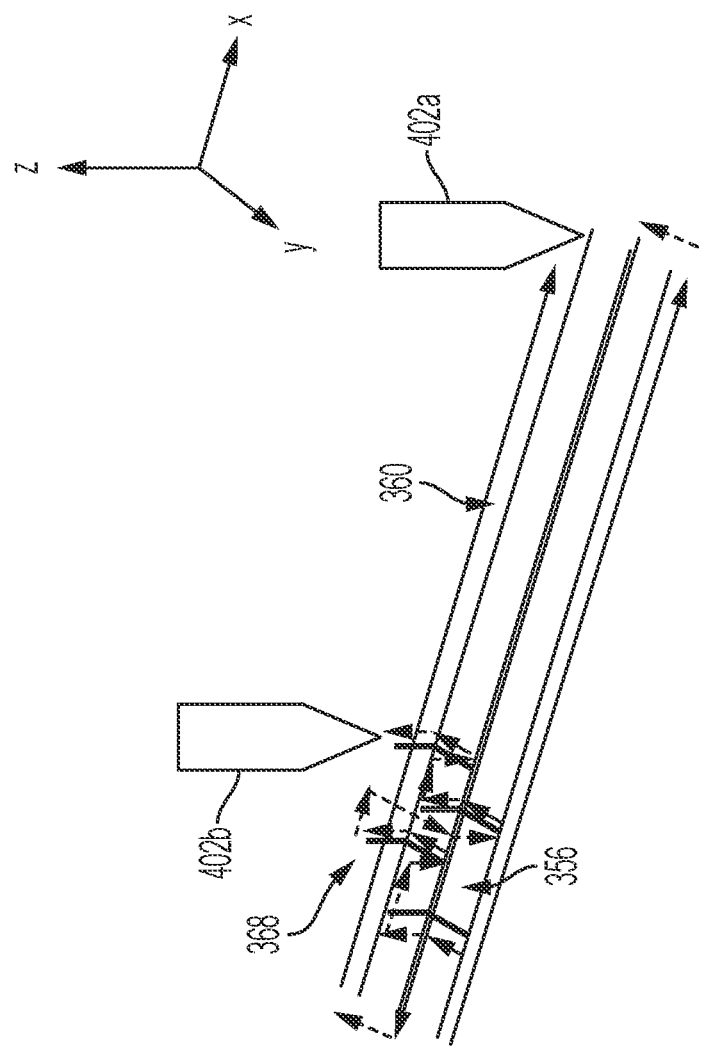
FIG. 6B illustrates exemplary nozzle movements for fabricating tape embodiments described herein.

FIG. 6B illustrates another example trajectory for the nozzle 402 for formation of the tape 350 including the three dimensional network 390, showing a nozzle 402 making the x-direction grid lines (e.g., second filaments 360), the y-direction grid lines (e.g., first filaments 356) and the pillars 368 (e.g., in a z-direction). Multiple nozzles 402 can be used for faster manufacturing. In one example, a first nozzle 402a is used for making the second filaments 360 in an x-direction, a second nozzle 402b is used for making the first filaments 356 in a y-direction, and a third nozzle is used for making the pillars 368 in the z-direction. In yet another example, the first nozzle 402a is used for making second filaments 360 and a second nozzle 402b is used for making first filaments 356 and pillars 368).

Figure 8:
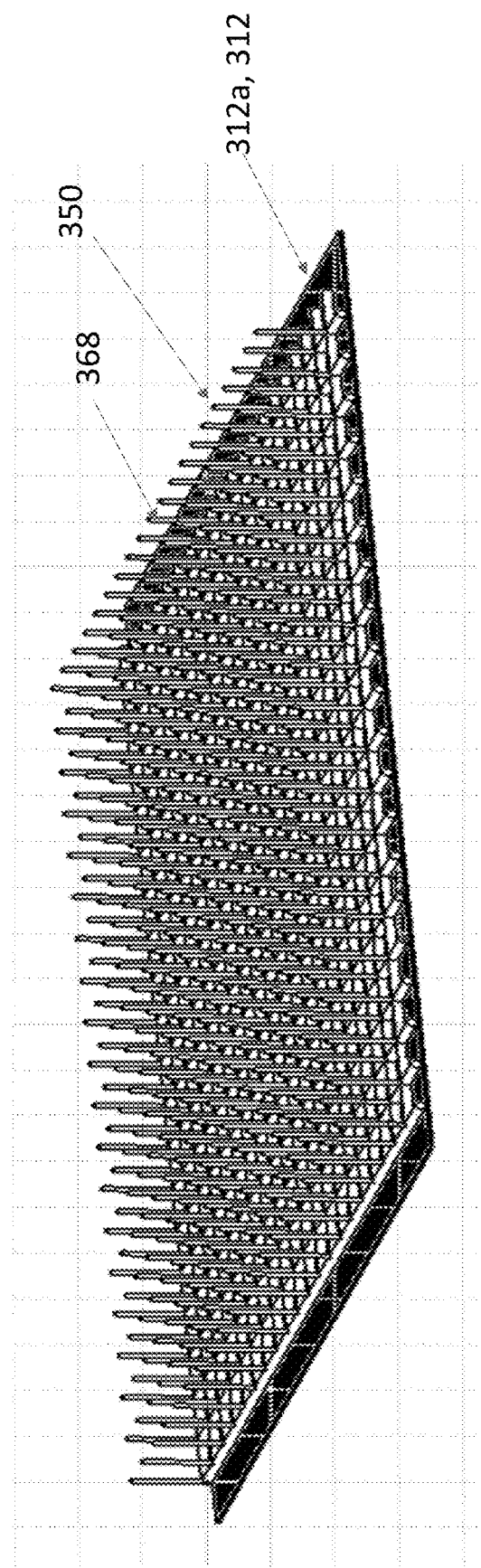
FIG. 8 illustrates a layer of fiber tows comprising with directly deposited 3D tape on one side, according to one or more examples.
Figure 9:
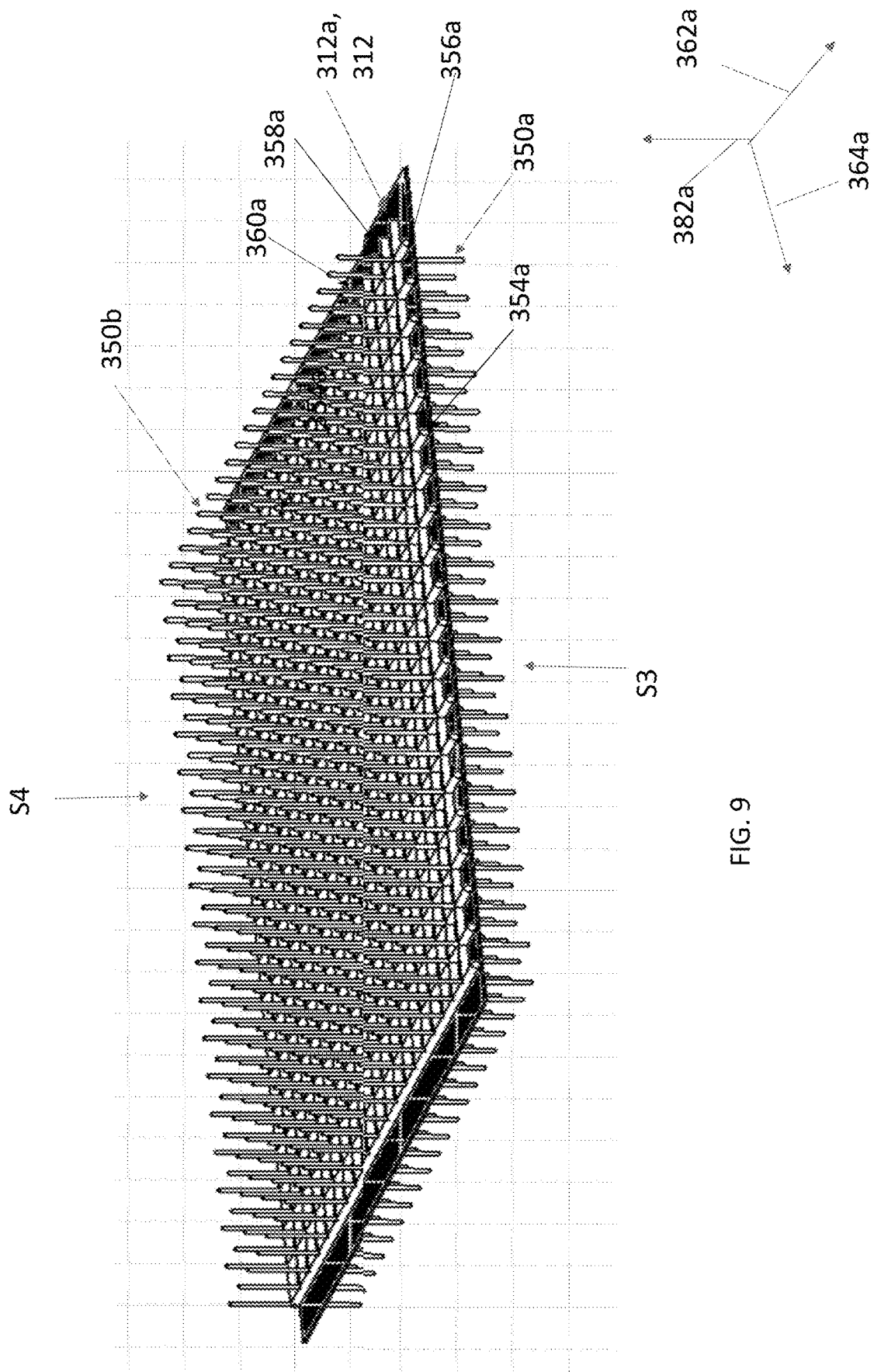
FIG. 9 illustrates a layer of fiber tows with directly deposited 3D tape on both sides, according to one or more examples.

In various examples, the tape 350 is attached or deposited (e.g., using adhesive) onto a layer 312 of fiber tows 302, so that the effective arrangement of the pillars 368 is as shown in FIG. 8 (single sided). FIG. 9 illustrates a double sided example wherein a first tape 350a is attached (e.g., using adhesive) on one side S3 of the layer 312 of fiber tows 302 and a second tape 350b is attached (e.g., using adhesive) on an opposite side S4 of the layer 312 of fiber tows.

In the example of FIG. 9, the filaments in the second two dimensional grid 352b of the second tape 350b can have the same orientation as, or a different orientation to, the filaments in the first two dimensional grid 352a of the first tape. Thus, the first two dimensional grid 352a can include a first set 354 of first filaments 356 and a second set 358 of second filaments 360, wherein the first set of first filaments are aligned in a first direction 362 and the second set of second filaments 360 are aligned in a second direction 364 so as to intersect with the first set of first filaments 356; and the second tape 350b can include a second two dimensional grid 352b including a third set 354a of third filaments 356a and a fourth set 358a of fourth filaments 360a, wherein the third set of third filaments 356a are aligned in a third direction 362a (same or different from the first direction 362) and the fourth set 358a of fourth filaments 360a are aligned in a fourth direction 364a (same or different from the second direction 364) so as to intersect with the third set 354a of the third filaments 356a.

Block 508 represents optionally coupling a layer (312) of fiber tows 302 to the pillars 368 so that one or more of the pillars 368 pass between the fiber tows (302) in the layers 312.

Block 510 represents optionally positioning a second tape 350b so that the pillars 368 in the second tape 350b entangle with or hook onto the pillars 368 in the underlying first tape 350a so as fasten or lock the layer 312 into place between the first tape 350a and the second tape 350b.

While the layers 312 of fiber tows (including base layer 408) or two dimensional grid 352 may be manufactured using three dimensional printing, in other embodiments, the layer 312 and/or the two dimensional grid 352 are fabricated using one or more methods different from three dimensional printing.

The process can be repeated to prepare a plurality of tapes 350 and layers 312 of fiber tows 302 that are entangled together.

Block 512 represents optional post processing steps. Although the tape 350 may be fabricated at room temperature, the composite article (300a) comprising the tapes 350 and the layers 312 of fiber tows may optionally be heated so that the material (314) bonds to the layers 312 after the pillars 368 and layers 312 of fiber tows have been formed or deposited. In one or more examples, the material (314) in the 3D network (390) bonds, at various strength levels, to the reinforcement fibers 302b in the fiber tows (302), subject to the surface tension of the deposited material (314) and melt temperature of the material (314). Other postprocessing techniques may be used to heat and bond the reinforcement fibers 302b in the fiber tows (302) and the 3D network 390 together in 3 dimensions, using vacuum forming or a roller.

Block 514 represents optionally combining the layers 312 of fiber tows 302 and the tapes 350 with resin (380). The resin (380) may fill gaps or pores 372 between the layers 312 of fiber tows and the 3D network 390. The resin may bond the tapes 350 comprising the 3D network 390 and the layers 312 of fiber tows 302 to form a composite article 300c.

Block 516 represents the end result, a composite article 300a, 300b, 300c, 300d comprising one or more tapes 350.

b. Exemplary Embodiments

The composite article 300a, 300b, 300c, 300d and/or tape 350 may be embodied in many ways. Examples, include but are not limited to, one or any combination of the following examples (referring to FIGS. 3-9).

1. A tape 350 comprising a two dimensional grid 352 including a first set 354 of first filaments 356 and a second set 358 of second filaments 360, wherein the first set 354 of first filaments 356 are aligned in a first direction 362 and the second set 358 of second filaments 360 are aligned in a second direction 364 so as to intersect with the first set 354 of the first filaments 356; and a plurality of pillars 368 extending (e.g., upwards 382a or downwards 382b) from the two dimensional grid 352 so that the first set 354 of first filaments 356, second set 358 of second filaments 360, and the plurality of pillars 368 form a three dimensional network 390.

2. The tape 350 of embodiment 1, wherein the three dimensional network 390 comprises a veil interlayer.

3. The tape 350 of embodiment 1 or 2, wherein the three dimensional network 390 is a three dimensional interlayer between layers 338a, 312 of fiber tows 302 in a laminate 392 (e.g., the three dimensional network is between the first layer 312a and the second layer 312b).

4. The tape 350 of embodiment 3, wherein the layers 338a, 312 (e.g., first layer 312a and second layer 312b) of fiber tows are adjacent layers in the laminate 392, the plurality of the pillars 368 extend to a maximum distance 396 from the two dimensional grid 352, the maximum distance 396 is measured in a direction perpendicular to the two dimensional grid 352, and the maximum distance 396 is less than the spacing 398 from the two dimensional grid 352 to a bottom B of the one of the adjacent layers 312, 338a closest to the two dimensional grid 352.

5. The tape 350 of embodiment 3, wherein the layers 338a, 312 (first layer 312a and second layer 312b) are adjacent layers in the laminate 392, the plurality of pillars 368 extend to a maximum distance 396 from the two dimensional grid 352, the maximum distance 396 is measured in a direction perpendicular to the two dimensional grid 352, and the maximum distance 396 is equal to a spacing from the two dimensional grid 352 to a top T2 of the one of the adjacent layers 312, 338a furthest from the two dimensional grid, so that the tips T of the pillars 368 are even with the top T2 of the one of the layers 312 (e.g., first layer 312a).

6. The tape 350 of embodiment 3, wherein the layers 338a, 312 (e.g., first layer 312a and second layer 312b) are adjacent layers in the laminate 392, the plurality of pillars 368 extend to a maximum distance 396 from the two dimensional grid 352, the maximum distance 396 is measured in a direction perpendicular to the two dimensional grid 352, and the maximum distance 396 is greater than the spacing from the two dimensional grid 352 to a top T2 of the one of the adjacent layers 312, 338a furthest from the two dimensional grid 352, so that the pillars extend through and above (i.e., from one side to the other side of) the one of the layers 338a, 312 (e.g., first layer 312a).

7. The tape 350 of one or any appropriate combination of embodiments 1-6 having one or more of the following dimensions:

Pillars 368 having a height H in a range of 0.3 mm≤H≤5 mm.

The pillars 368 extending from the two dimensional grid 352 have a spacing $S_E$ between adjacent pillars 368 in a range of 0.8 mm≤$S_E$≤5 mm.

A spacing $S_h$ between adjacent first filaments 356 in the first set 354 of first filaments is 0.8 mm≤$S_h$≤5 mm, and a spacing $S_v$ between adjacent second filaments 360 in the second set 358 of second filaments is 0.8 mm≤$S_v$≤5 mm.

The pillars 368 have an average diameter $E_d$ in a range 0.02 mm≤$E_d$≤1 mm.

The first filaments 356 in the first set 354 and the second filaments 360 in the second set 358 independently have an diameter $d_v$, $d_h$ in a range 0.04 mm≤d≤2 mm.

The two dimensional grid 352 comprising a mesh 374 including pores 372 bounded by first filaments 356 and the second filaments 360, wherein the pores 372 comprise between 40-80% of a surface area A of the mesh 374 so as to facilitate resin 380 infusion into the tape 350.

The pillars 368 inclined at an angle θ in a range from zero to five degrees, wherein the angle θ is between a line 322a, passing through a base 318 of the pillar 368 and a tip T of the pillar 368, and a direction 322b perpendicular to the two dimensional grid 352.

8. The tape 350 of one or any functional combination of embodiments 1-7, wherein the pillars 368 extend (e.g., upwards 382a or downwards 382b) from the intersections 398a between the first filaments 356 and the second filaments 360.

9. The tape 350 of one or any functional combination of embodiments 1-8, wherein the pillars 368 extend (e.g., upwards 382a or downwards 382b) from the first filaments 356 or second filaments 360 at a location 399 between the intersections 398a between the first filaments 356 and the second filaments 360.

10. The tape 350 of one or any functional combination of embodiments 1-9, comprising a first tape 350a wherein the pillars 368 in the first tape 350a are configured to hook onto, entangle with, or intertwine with the pillars 368 extending from a second two dimensional grid 352b in a second tape 350b, so as to join the first tape 350a to the second tape 350b.

11. The tape 350 of one or any functional combination of embodiments 1-10, wherein the first filaments 356, the second filaments 360, and/or the pillars 368 comprise material used for additive manufacturing.

12. The tape 350 of one or any functional combination of embodiments 1-11, wherein the pillars 368 comprise drawn material and/or fibers.

13. The tape 350 of one or any functional combination of embodiments 1-12, wherein the first filaments 356, the second filaments 360, and/or the pillars 368 comprise a thermoplastic or a hybrid of the thermoplastic.

14. The tape 350 (e.g., adhesive) of one or any functional combination of embodiments 1-13, comprising a first tape 350a wherein the pillars 368 comprise any shape or configuration suitable for intertwining with, mechanically interlocking with, entangling with, intermingling with, wrapping around, connecting to, hooking onto, adhering to, locking onto or attaching through static electrical forces or frictional forces onto, pillars 368 on an adjacent tape comprising a second tape 350b, when the first tape 350a and the second tape 350b are pressed together. In this way, first tape 350a and the second tape 350b adhere to one another. Pillars 368 may be bent or slumped over on themselves, for example, or have uniform or non uniform cross-sections.

15. A composite article 300d comprising a first tape 350a (e.g., according to one or any combination of embodiments 1-14) including a first two dimensional grid 352a including a first set 354 of first filaments 356 and a second set 358 of second filaments 360, wherein the first set of first filaments 356 are aligned in a first direction 362 and the second set of second filaments 360 are aligned in a second direction 364 so as to intersect with the first set of first filaments 356; and a first plurality 366a of pillars 368 extending (e.g., upwards 382a or downwards 382b) from the first two dimensional grid 352a. The composite article 300d further comprises a second tape 350b (e.g., according to one or any combination of embodiments 1-14) including a second two dimensional grid 352b including a third set 354a of third filaments 356a and a fourth set 358a of fourth filaments 360a, wherein the third set 354a of third filaments 356a are aligned in a third direction 362a and the fourth set 358a of fourth filaments 360a are aligned in a fourth direction 364a so as to intersect with the third set of the third filaments 356a; a second plurality 366b of pillars 368 extending (e.g., upwards 382a or downwards 382b) from the two dimensional grid 352b, wherein each of the first plurality 366a of pillars 368 are hooked onto one of the second plurality 366b of pillars 368.

16. The composite article of embodiment 15, further including a layer 338a, 312 of fiber tows 302 between the first tape 350a and the second tape 350b, wherein the first plurality 366a of the pillars 368 extend to a maximum distance 396 (e.g., above or below) from the first two dimensional grid 352a, the maximum distance 396 is measured in a direction perpendicular to the first two dimensional grid 352a, and the maximum distance 396 is less than the spacing 398 from the first two dimensional grid 352a to a bottom B of the layer 312, 338a.

17. The composite article of embodiment 15, further including a layer 338a, 312 of fiber tows 302 between the first tape 350a and the second tape 350b, wherein the first plurality 366a of pillars 368 extend to a maximum distance 396 (e.g., above or below) from the first two dimensional grid 352a, the maximum distance 396 is measured in a direction perpendicular to the first two dimensional grid 352a, and the maximum distance 396 is equal to a spacing from the first two dimensional grid 352a to a top T2 of the one of the adjacent layers 312, 338a, so that the tips T of the pillars 368 are even with the top T2 of the one of the layers 312 (the top T2 is on a surface of the adjacent layer 312 furthest from the first two dimensional grid 352a).

18. The composite article of embodiment 15, further including a layer 312, 338a of fiber tows 302 between the first tape 350a and the second tape 350b, wherein the first plurality 366a of pillars 368 extend to a maximum distance 396 (e.g., above or below) from the first two dimensional grid 352a, the maximum distance 396 is measured in a direction perpendicular to the first two dimensional grid 352a, and the maximum distance 396 is greater than the spacing from the first two dimensional grid 352a to a top T2 of the one of the adjacent layers 312, 338a, so that the pillars extend through and above the one of the adjacent layers 312, 338a (i.e., from one side of the layer 312 through to the other side of the layer 312). The top T2 is on a surface of the adjacent layer 312 furthest from the first two dimensional grid 352a.

19. An integrated aircraft structure 1000 comprising the composite article of any of the embodiments 15-18, further comprising a skin attached to the first tape 350a; a stiffener attached to the second tape; and resin 380 filling pores 372 in the two dimensional grids 352.

20. The composite article 300d in one or any functional combination of the embodiments 1-19, wherein a layer 312 of fiber tows 302 is between adjacent tapes 350 and the fiber tows are arranged so as to form a braid or braids including the fiber tows, a non-crimp fabric including the fiber tows, a woven or woven material (including a three dimensional woven or three dimensional woven material) including the fiber tows, or a uni-directional tape including the fiber tows.

21. The tape 350 of one or any functional combination of embodiments 1-20, wherein the tape 350 is manufactured as a product separately from the layers of fiber tows 302.

22. The tape 350 of embodiment 21, wherein the tape is manufactured as a roll of tape so as to form a roll comprising the tape.

23. The composite article 300a, 300b, 300c, 300d of one or any functional combination of embodiments 1-23 comprising intertwining or mingling of the pillars of a first tape 350a with the pillars of the second tape 350b, wherein the intertwining or mingling comprises a mechanical interlocking mechanism (e.g., pillar of the first tape 350 comprising a hook hooking or interlocking onto pillar of second tape comprising a loop, or pillar of the first tape 350 comprising a hook hooking or interlocking onto pillar of second tape comprising a hook).

24. The tape 350 of one or any functional combination of embodiments 1-23, wherein the tape 350 comprises the pillars 368 comprising a material composition and dimensions (e.g., height H, average diameter Ed, spacing $S_E$ between adjacent pillars 368), the first filaments 356 and the second filaments 360 having a material composition and dimensions (e.g., spacing $S_h$ between adjacent first filaments, spacing $S_v$ between adjacent second filaments 360, diameter $d_v$, $d_h$ of the first filaments and the second filaments) such that the tape 350 has an areal weight Aw in a range of 20≤Aw≤100 grams per square meter (gsm), an areal weight of 45≤Aw≤60 gsm, an areal weight of approximately 50 gsm, or an areal weight of more than 6 gsm, or an areal weight of at least 40 gsm or at least 50 gsm, and wherein areal weight is total weight of the tape 350 (weight of the pillars 368+weight of the first filaments 356+weight of the second filaments 360 in the tape) per unit area (width× length) of the tape 350.

25. The tape 350 of one or any functional combination of embodiments 1-24, wherein the pillars 368 comprise a hook or each have an end comprising a hook, e.g., a hook having a swan neck shape or as illustrated in FIG. 7B.

26. The composite article 300d of one or any functional combination of embodiments 1-25, comprising the tapes 350 stick or anchor the layers 312 of fiber tows 302 and the tapes together so as to form a T shaped stiffener preform at room temperature.

27. The composite article 300d of one or any functional combination of the embodiments 1-26 comprising a laminate, wherein the tape 350 comprises the pillars 368 comprising a material composition and dimensions (e.g., height H, average diameter Ed, spacing $S_E$ between adjacent pillars 368), the first filaments 356 and the second filaments 360 having a material composition and dimensions (e.g., spacing $S_h$ between adjacent first filaments, spacing $S_v$ between adjacent second filaments 360, diameter $d_v$, $d_h$ of the first filaments and the second filaments), and the layers 312 comprise fiber tows 302 having a material composition and dimensions such that the composite article 300d exhibits a Gic increased by at least 80% or at least 200% when the tape has an areal weight of 2 gsm or in a range of 2 gsm≤Aw≤60 gsm, as compared to the composite article 300d wherein the layers of fiber tows 302 are fastened together without the tapes.

In one or more examples, the pillars 368 comprising z-directional fibers link between intermediate filament layers (306), to form a connected three dimensional network 390 around a distribution of fiber tows (302). The fiber tows may comprise of fibers or filaments, arranged in a reinforcement form, including braids, wovens, non-crimp fabrics and unidirectional forms. The filaments may be composed primarily of carbon, glass, and/or aramid. Other filaments, in combination with the aforementioned, may also include polyamide, polyetherimide, polyetherketone, polyetheretherketone, polyetherketoneketone, polyimide, phenoxy and polyphenylsulphone. Multiple layers of fiber tows comprising reinforcement fibers may be formed with braids, wovens, non-crimp fabrics and unidirectional formats. The location of the pillars within the pore space between fiber tows within these multiple layers of fiber tows, together with the two dimensional grid 352, creates the (e.g., thermoplastic) network (in x, y, and z directions).

One of skill in the art understands that the various elements of the tape and/or layers of fiber tows discussed may be combined in a variety of ways as discussed herein.

b. Pillar Morphology

The morphology of the deposited material (314) can be controlled using the three dimensional printer (400). In illustrative embodiments described herein, the key elements of the deposited material (314) include the anchor (316), the base (318) and the upright (320), as illustrated in FIG. 3B. FIG. 3B and FIG. 3H illustrate an example wherein each of the pillars 368 are attached at one end to a base 318 and the base 318 is wider than the each of the pillars 368.

TABLE 3

Example extrusion and anchor morphologies as a function of print settings

| Component name | Print Setting | Dimensions range | Description/Comments |
|---|---|---|---|
| Anchor (316) | Nozzle extruding | Length: >1 mm Width: 0.15-0.6 mm | Typically 3 mm long and 0.43 mm wide for a 0.4 mm nozzle Width and shape vary depending on where on layer of fiber towsthe anchor crosses. |
| base (318) | Nozzle extruding for ~0.5 mm and off for the remainder of the process. | Length: 0.3-1.5 mm long (depending on combination of user programming and nozzle diameter and/or speed) | Typically 0.8 mm long Coned area with base to tip ratio ~3.5 |
| Extrusion or upright (320) | Nozzle head not extruding | Length: 2.5-5 mm (dependent on average diameter of 0.002-0.03 mm. | Typically 2.5 mm long with average diameter of 0.01 mm for a 0.4 mm nozzle Coning ratio with bottom to top of extrusion ~1.25 |

Note: The dimensions ranges are greatly determined by the nozzle (402) diameter, print settings and the user input (software/programming language). In any of the examples described herein, the pillars 368 may be defined as comprising the upright (320) only (not including the base (318)). In other examples, the pillars 368 are defined as comprising the base (318) and the upright (320) on the base (318). The height H and average diameter Ed may refer to the combined height of the base (318) and upright (320) or the height of the upright (320), for example.

In one or more examples, the two dimensional grid 352 and/or the pillars 368 have a roughened or irregular surface that aids mechanical interlocking with the resin.

In one or more examples, the pillars are thicker at a base (318) from which the pillar 368 is drawn.

Example Applications

In one or more embodiments, the tapes 350 described herein are used to toughen composites used on aircraft, particularly at high stress concentration regions where mode I or mode II loads are experienced, e.g., in an Integrated Aircraft Structure (IAS). Integrated Aircraft Structures are currently being joined by fasteners that provide a source of redundancy to encourage predictable failure in an otherwise brittle epoxy due to the poor fracture toughness properties of composites. However, the primary problem with using fasteners is the increased weight they induce as parts are often made thicker than necessary to account for the high stress concentrations from the fastener holes. Additionally, composite failure due to bolts and fasteners initiates locally at the hole but then tends to propagate in the through-thickness direction. By increasing the fracture toughness and providing a means for a more predictable failure, IAS can be joined more effectively using composite articles described herein. More specifically, embodiments of the tapes 350 described herein improve mode I and mode II fracture toughness to provide a way for stable composite failure needs to be employed so as to either reduce the fasteners used for connecting composite parts, or to minimize the safety factor that is applied to part thickness when being mechanically joined.

Figure 10:
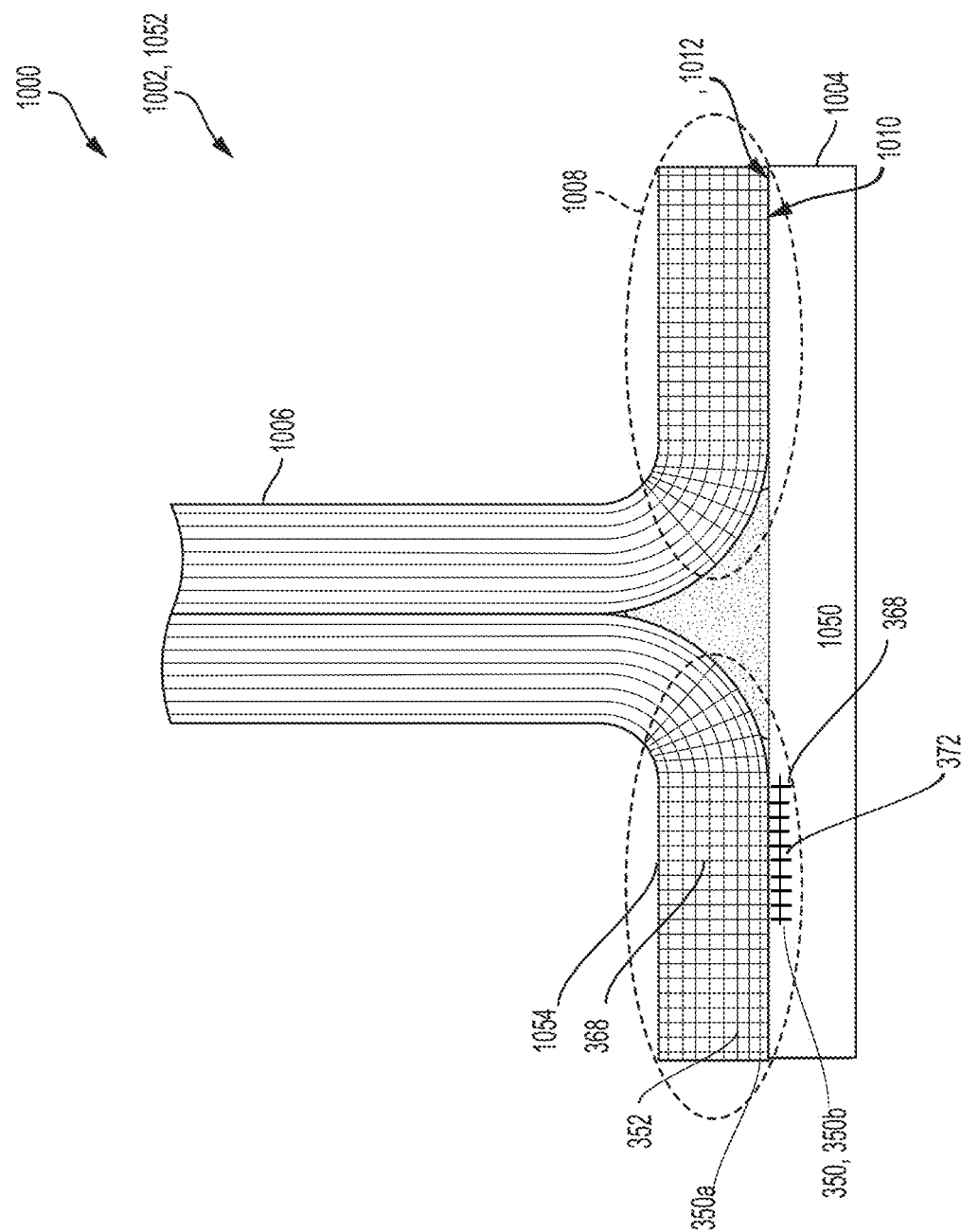
FIG. 10 illustrates an example T-joint incorporating a composite article as described herein.

Moreover, the approaches described herein facilitate a rate and cost effective methodology for manufacturing integrated aircraft structures with dry fiber preforms comprising multiple layers 312 of fiber tows 302, including braids, wovens and non-crimp fabrics. Embodiments of the tapes described herein do not inhibit the flow of resin between the layers 312 of fiber tows and contribute to the bond strength between interfaces of the layers 312 of fiber tows. The tape 350 can be readily placed across a wing, fuselage, empennage, edges or fairing to enable for room temperature lay-up of the layers of fiber tows, with the flexibility to use hand or a range of automated lay-up techniques. FIG. 10 illustrates an article of manufacture 1052 integrated aircraft structure 1000 (a T-joint 1002) comprising a first component 1050 (skin 1004) comprising or attached to one or more tapes 350; a second component 1054 (stiffener 1006) comprising or attached to one or more tapes 350; and resin 380 filling pores 372 in the two dimensional grids 352 of the tapes 350. As illustrated herein, the tapes 350 may comprise a first tape 350a and a second tape 350b, wherein pillars 368 extending from the first tape 350a are interlocked with the pillars 368 extending from the second tape 350b. In one or more examples, a first tape 350a is attached to a first surface 1010 of the stiffener and the second tape 350b is attached to the second surface 1012 of the skin 1004 (the first surface 1010, the second surface 1012, the first tape 350a, and the second tape 350b are at the interface 1008 between the skin and the stiffener). In one or more examples, the integrated aircraft structure 1000 is in a wing of an aircraft.

The composite articles 300a-300d and tape 350 according to embodiments of the present invention are not limited to use in integrated aircraft structures. The composite articles and tape 350 described herein may be used in any applications that require improvement in the damage tolerance of composites, e.g., multipurpose three dimensional veils.

Example Composite Article Fabrication Methods

1. Using Tapes to Fasten Layers of Fiber Tows

Figure 11A:
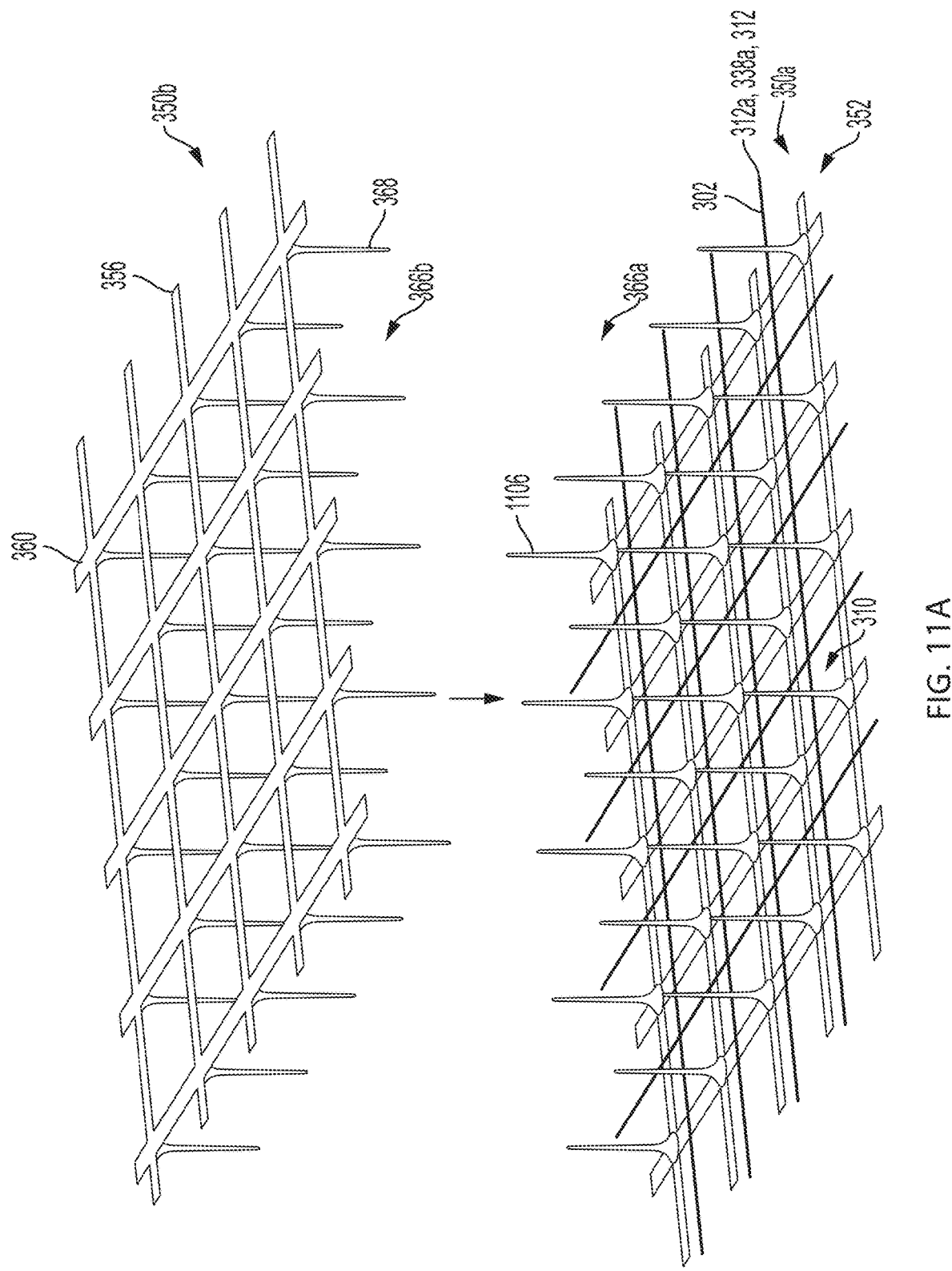
FIG. 11A illustrates a method of making a composite article, according to one or more examples.
Figure 11B:
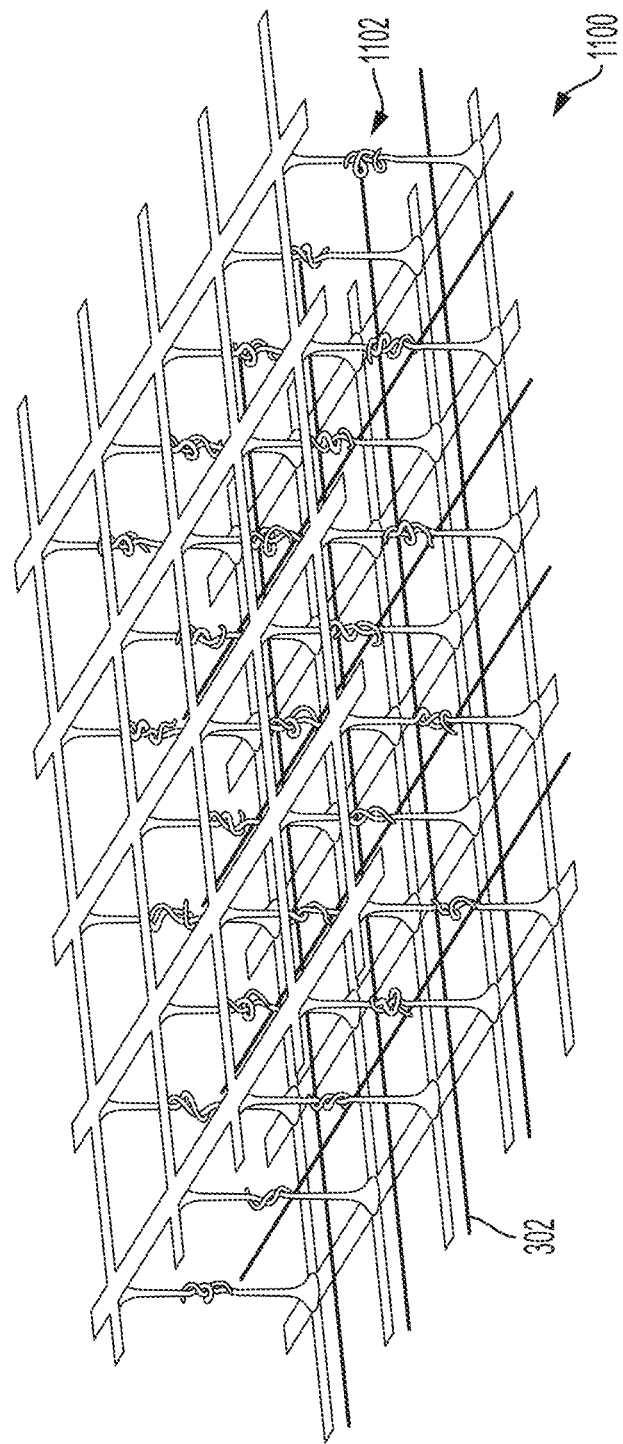
FIG. 11B illustrates the composite article fabricated according to the method illustrated in FIG. 11A.
Figure 11C:
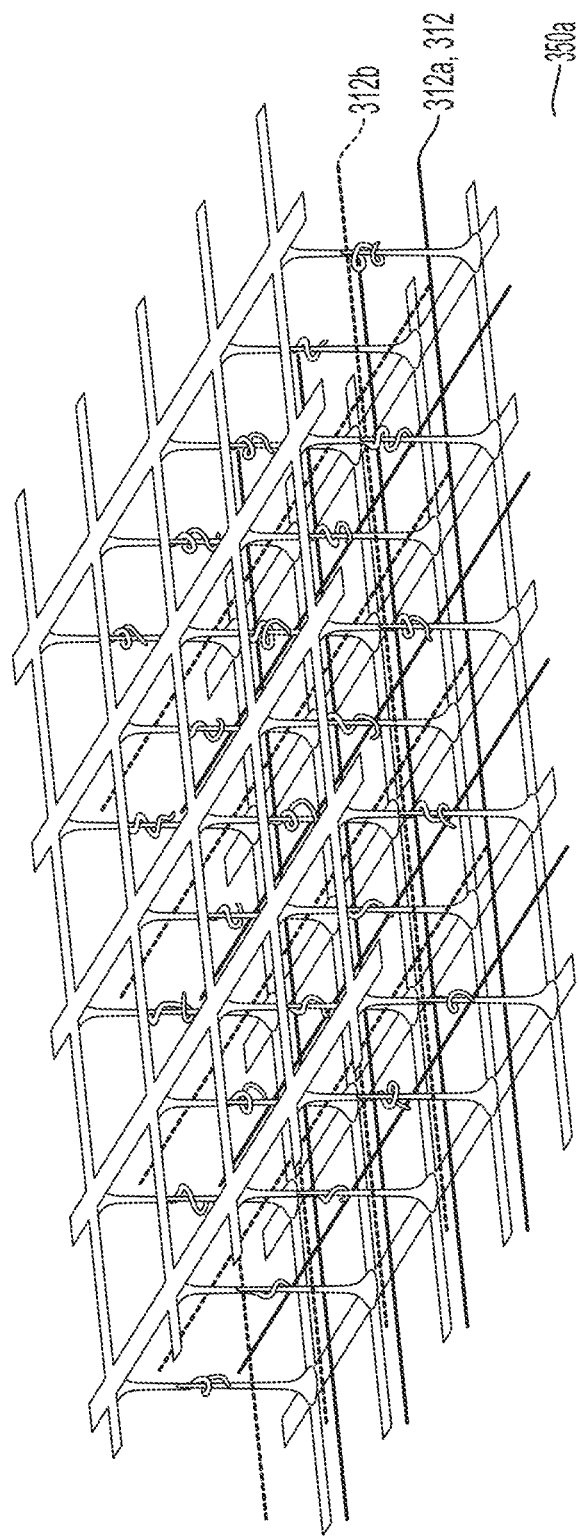
FIG. 11C illustrates the composite article fabricated according to the method illustrated in FIG. 11A wherein a plurality of layers of fiber tows are between a pair of tapes.

FIGS. 11A, 11B, and 11C illustrate a method of making a composite article 1100 (referring also to FIGS. 3A-3L and FIG. 10). As illustrated in FIG. 11A, the method comprises positioning one or more layers 338a, 312 (e.g., first layer 312a and/or second layer 312b) of fiber tows 302 between a plurality of tapes 350 including a first tape 350a and a second tape 350b, wherein each tape 350 includes:

(1) a two dimensional grid 352 including a first set 354 of first filaments 356 and a second set 358 of second filaments 360, wherein the first set 354 of first filaments 356 are aligned in a first direction 362 and the second set 358 of second filaments 360 are aligned in a second direction 364 so as to intersect with the first set 354 of the first filaments 356; and (2) a plurality of pillars 368 extending from the two dimensional grid 352 so that the first set 354 of first filaments 356, second set 358 of second filaments 360, and the plurality of pillars 368 form a three dimensional network 390;

The positioning is such that the pillars 368 of the first tape 350a pass into spaces 310 between the fiber tows 302.

1. FIG. 11A illustrates the positioning comprises laying a layer 312 (e.g., first layer 312a) on the first tape 350a so that a first plurality 366a of the pillars 368 of the first tape 350a pass through spaces 310 between the fiber tows 302 of the layer 312; and positioning the second tape 350b (comprising a second plurality 366b of pillars 368) on the layer 312 so that the second plurality 366b of the pillars 368 of the second tape 350b hook 1102 onto portions 1106 of the first plurality 366a of pillars 368 of the first tape 350a that have passed through the spaces 310 (as illustrated in FIG. 11B). In some embodiments, a plurality of the pillars 368 pass through the same space 310 and/or each of a plurality of the pillars 368 pass through different spaces 310.

Figure 11D:
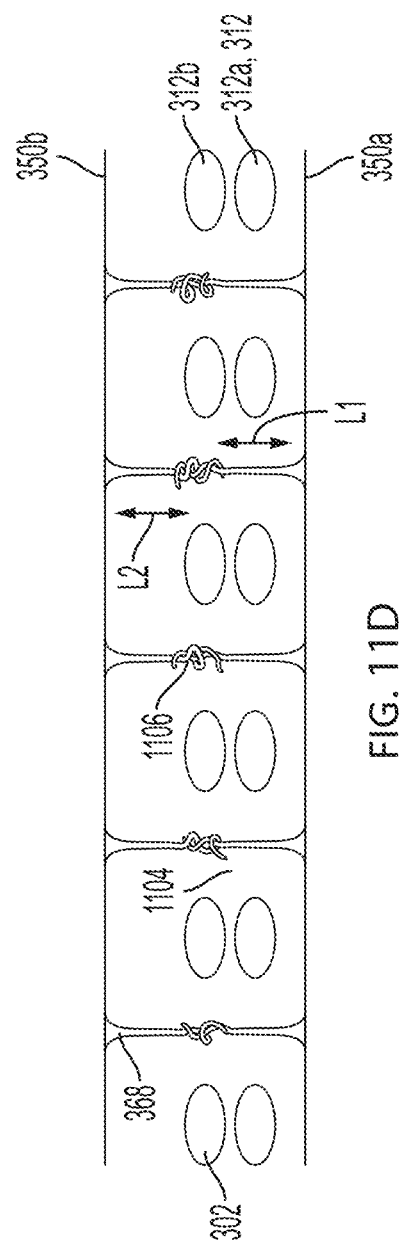
FIG. 11D is a sideview of the embodiment of FIG. 11C.

2. The layer 312 is one of a plurality of the layers (e.g., first layer 312a and second layer 312b) each comprising the fiber tows 302 and the positioning comprises:

a. sequentially laying each of the plurality of the layers 312 on the first tape 350a so that:

(i) a plurality of the different spaces 310 between the fiber tows 302 in each of the layers 312 are stacked above one another and form a plurality of stacked openings 1104 through all or a plurality of the layers 312 (see FIG. 11C and FIG. 11D), and (ii) the first plurality 366a pillars 368 of the first tape 350a extend through or into the stacked openings 1104 (e.g., each of a plurality of the pillars 368 through different stacked openings 1104 and/or a plurality of the pillars through a same stacked opening 1104); and b. positioning the second tape 350b on the layers 312 so that at least some of the second plurality 366b of pillars 368 of the second tape 350b hook onto portions 1106 of the pillars 368 of the first tape 350a that have passed through or into the stacked openings 1104 (as illustrated in FIG. 11C and FIG. 11D).

3. The method of embodiment 2, wherein the layers 312 comprise a first layer 312a and a second layer 312b; the first plurality 366a pillars 368 of the first tape 350a have a first length L1 passing into the stacked openings 1104, through the first layer 312a, and into the second layer 312b; and the second plurality 366b of the pillars 368 of the second tape 350b have a second length L2 passing into the stacked openings 1104 and through the second layer 312b, but the second length L2 is too short to reach the first layer 312a (as illustrated in FIG. 11D).

4. The method of any of the embodiments 1-3, wherein the pillars 368 include first pillars 368c extending from a first side S1 of the two dimensional grid 352 and second pillars 368d extending from a second side S2 of the two dimensional grid 352 (e.g., as illustrated in FIG. 11E and FIG. 11F).

5. FIG. 11E and FIG. 11F further illustrate an embodiment of embodiment 4, wherein the tapes 350 include a third tape 350c, the method further comprising:

a. positioning an additional layer (second layer 312b) comprising the fiber tows 302 on the second tape 350b, wherein the pillars 368 (first pillars 368c) on the first side S1 of the second tape 350b extend towards the additional layer (second layer 312b) and the pillars 368 (second pillars 368d) on the second side S2 of the second tape 350b extend towards the layer 312 (e.g., first layer 312a); and b. laying the third tape 350c on the additional layer (e.g., second layer 312b) so that a plurality of the pillars 368 (second pillars 368d) on a second side S2 of the third tape 350c hook onto the pillars (first pillars 368c) extending (e.g., upwards) from the first side S1 of the second tape 350b. The pillars 368 (second pillars 368d) extending from the second side S2 of the third tape 350c and/or the pillars 368 (first pillars 368c) extending from the first side S1 in the second tape 350b pass into or through spaces 310 between the fiber tows 302 in the additional layer (e.g., second layer 312b).

Figure 11E:
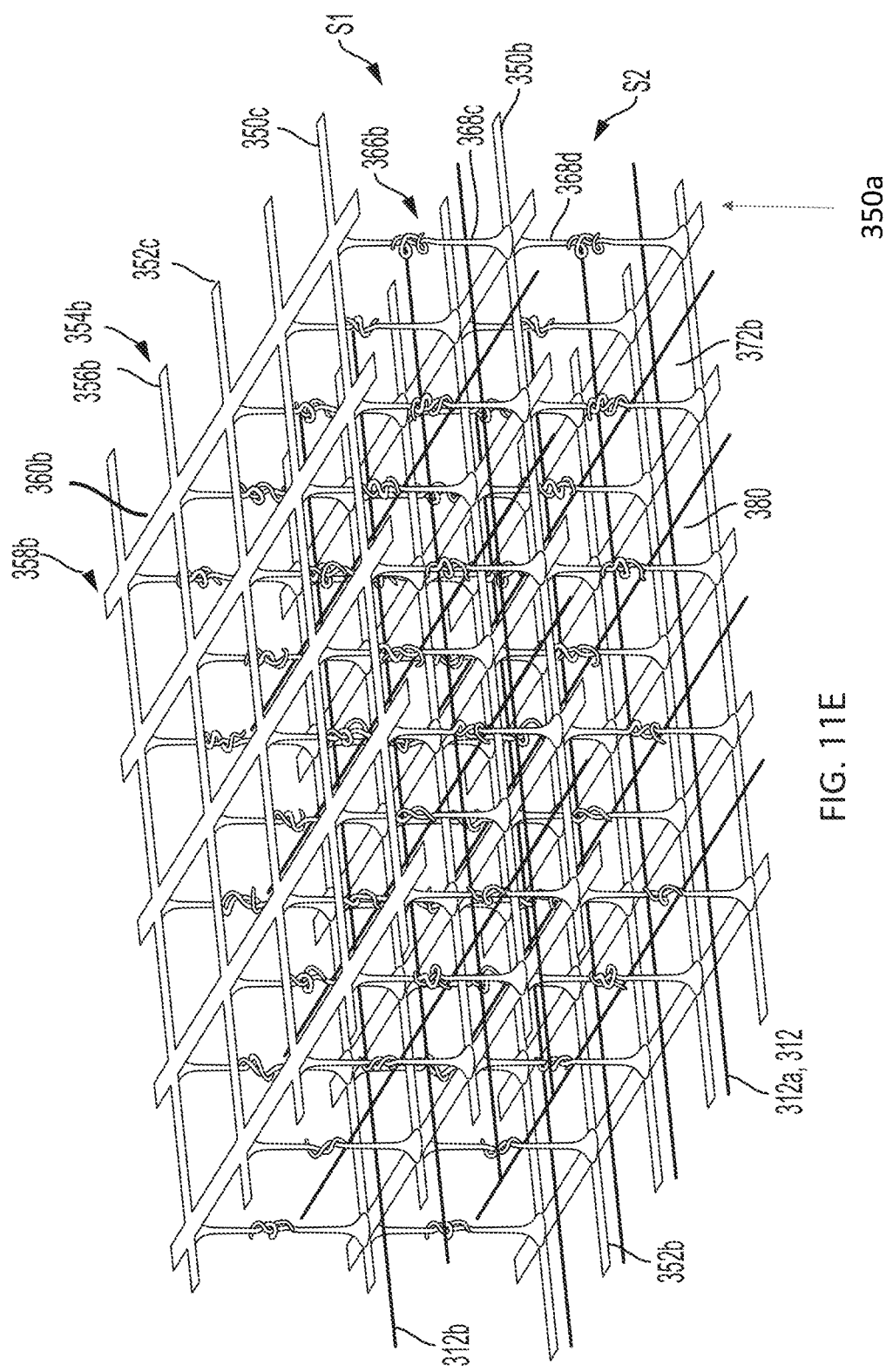
FIG. 11E illustrates the composite article fabricated using a double sided tape, according to one or more examples.
Figure 11F:
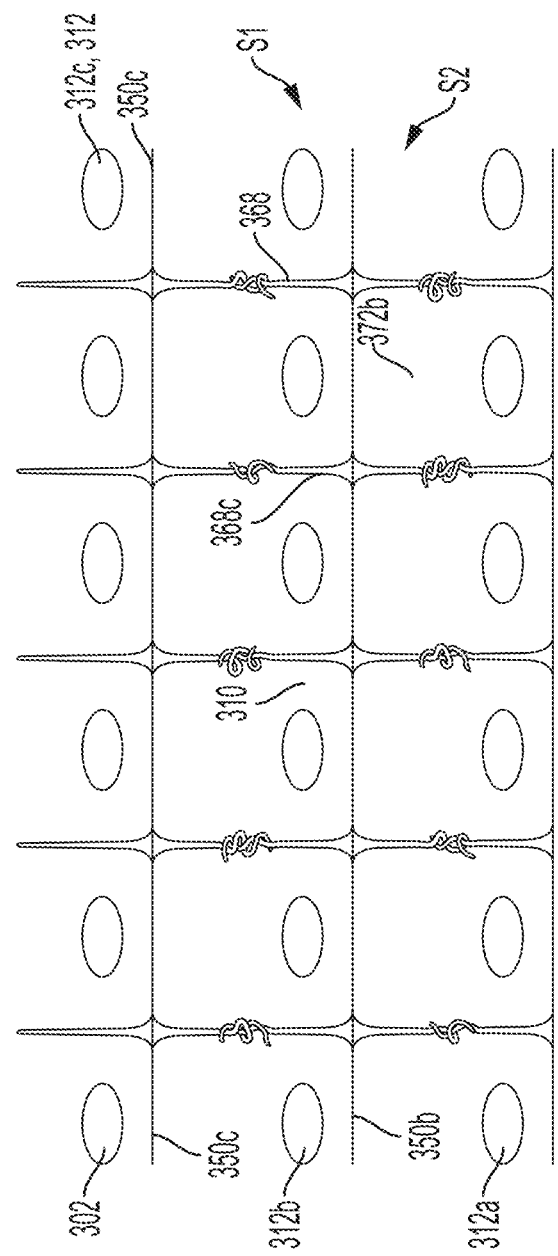
FIG. 11F is a sideview of the embodiment of FIG. 11E.

Thus FIG. 11E and FIG. 11F illustrate a double sided tape embodiment comprising the second tape 350b connected to the first tape 350a and the third tape 350c. As described herein, the first tape 350a includes a first two dimensional grid 352a including a first set 354 of first filaments 356 aligned in a first direction and a second set 358 of second filaments 360 aligned in a second direction, the second tape 350b includes a second two dimensional grid 352b including a third set 354a of third filaments 356a aligned in a third direction and a fourth set 358a of fourth filaments 360a aligned in a fourth direction, and the third tape 350c includes a third two dimensional grid 352c having a fifth set 354b of fifth filaments 356b and a sixth set 358b of sixth filaments 360b, wherein the fifth set of fifth filaments are aligned in a fifth direction and the sixth set of sixth filaments are aligned in a sixth direction so as to intersect with the fifth set of fifth filaments 356b. The first, third, and fifth directions can be the same or different, and the second, fourth, and sixth directions can be the same or different.

The second tape 350b comprises a second plurality 366b of pillars 368 including pillars 368 (first pillars 368c) extending (e.g., upwards) from a first side S1 of the second two dimensional grid 352b and pillars 368 (second pillars 368d) extending (e.g., downwards) from a second side S2 of the second two dimensional grid 352b. Pillars 368 (second pillars 368d) extend (e.g., downwards) from a second side of the third two dimensional grid 352c in the third tape 350c so as to hook onto, entangle with, or intertwine with the pillars 368 (first pillars 368c) extending from the first side S1 of the second tape 350b. In some embodiments, a plurality of pillars 368 pass through the same space 310 and/or each of a plurality of the pillars 368 pass through different spaces 310 (or different pillars 368 pass through different spaces 310).

6. The method of embodiment 5, wherein the first tape 350a, the second tape 350b, and the layer(s) 312 are in a first component 1050 of an article of manufacture 1052; and the additional layer (e.g., second layer 312b) and the third tape 350c are in a second component 1054 of the article of manufacture 1052 (as illustrated in FIGS. 11E and 10).

7. The method of embodiment 6, wherein the first component 1050 comprises a skin 1004 of an integrated aircraft structure 1000 and the second component 1054 comprises a stiffener 1006 of the integrated aircraft structure 1000 (as illustrated in FIGS. 11E and 10).

8. The method of any of the embodiments 1-7, further comprising applying resin 380 into each of a plurality of pores spaces 372b between the first filaments 356, the second filaments 360, and the pillars 368 in the three dimensional network 390 of the first tape 350a, the second tape 350b, and/or the third tape 350c.

2. Using the Tape to Attach Components.

Figure 12A:
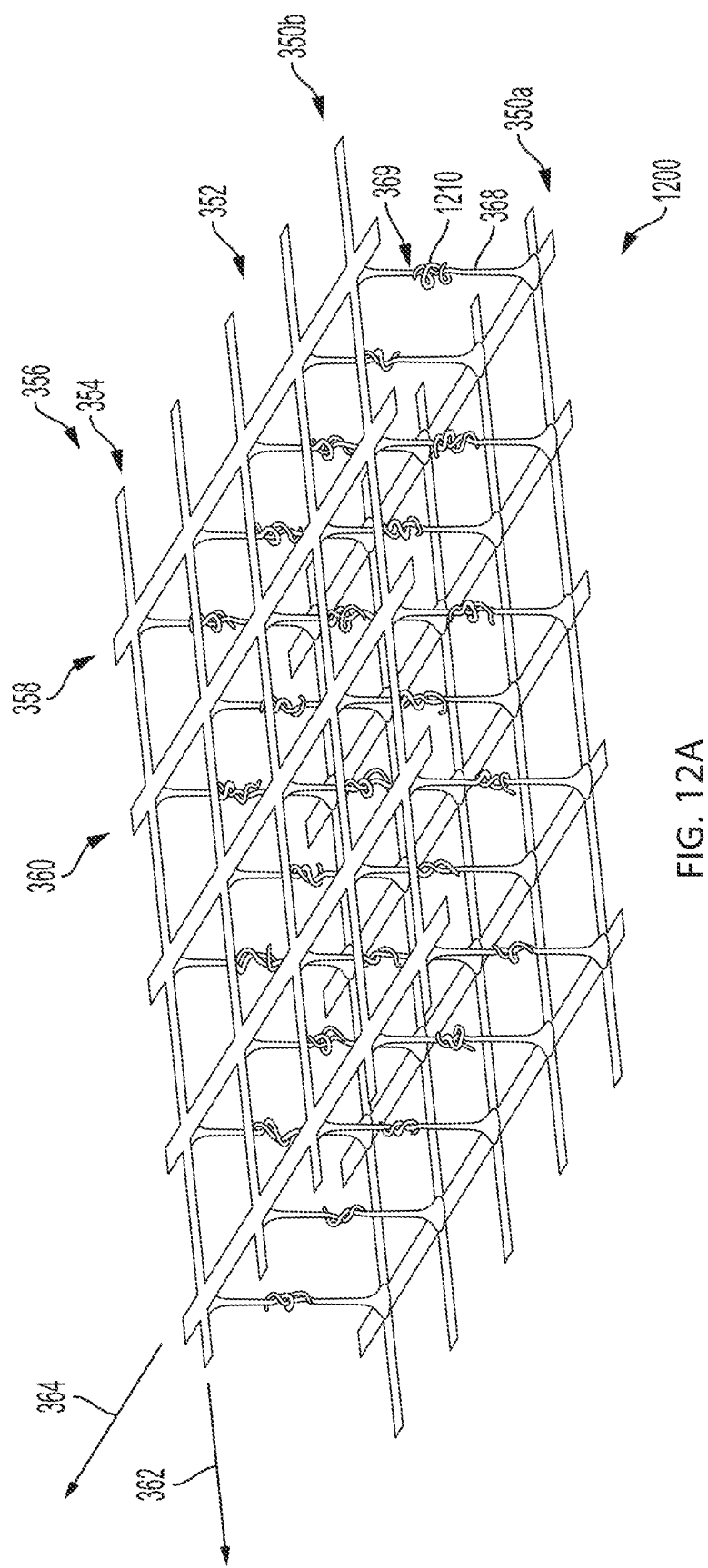
FIG. 12A illustrates a method of connecting components using tape, according to one or more examples.
Figure 12B:
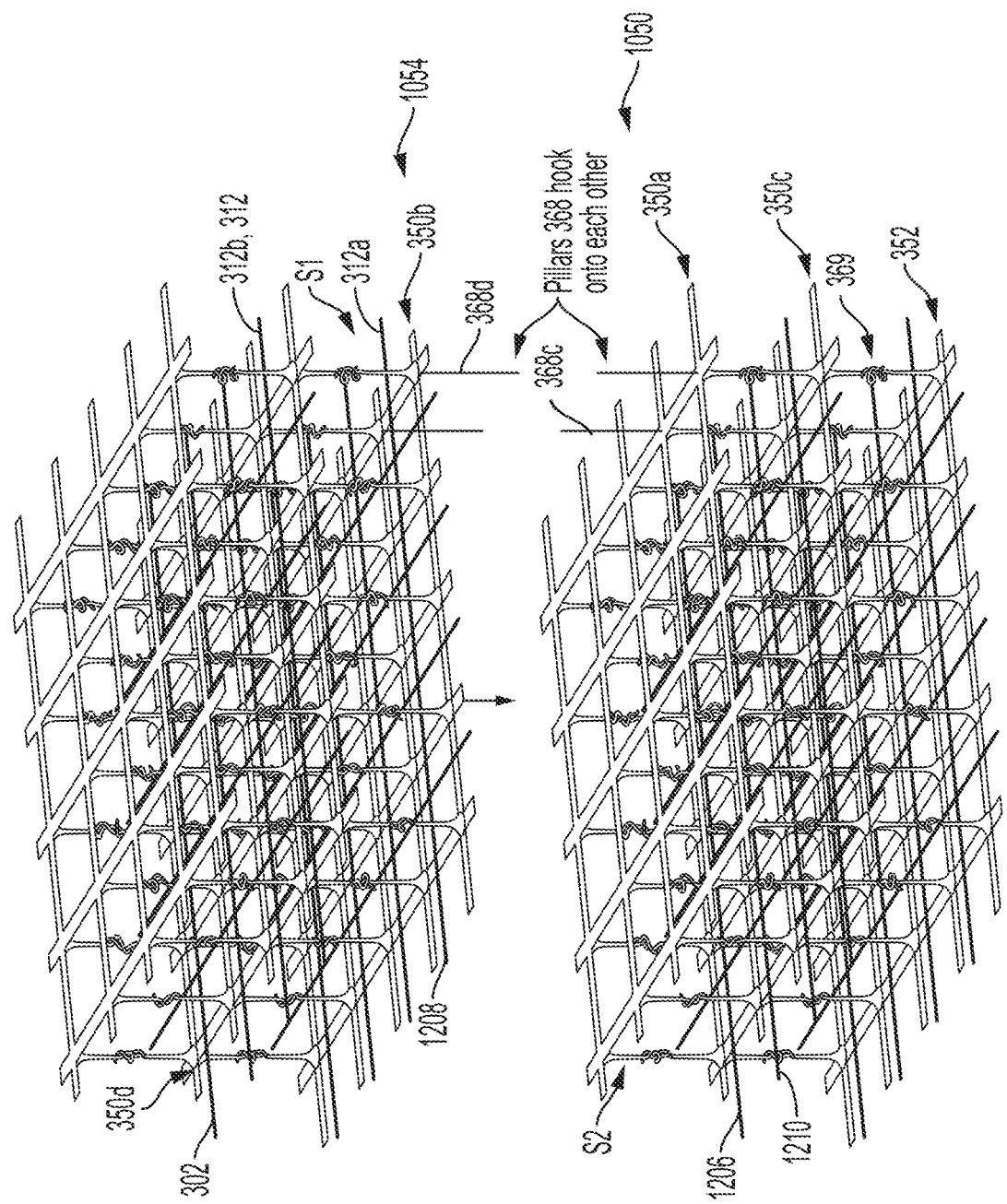
FIG. 12B illustrates a method of connecting components using tape according to one or more examples, wherein the components also include tape.

FIGS. 12A and 12B illustrate a method of making a composite article 1200 (referring to FIGS. 3A-3L and FIG. 10).

The method comprises attaching a plurality of tapes 350 including a first tape 350a and a second tape 350b, wherein the first tape 350a is attached to a first component 1050 and the second tape 350b is attached to a second component 1054. Each tape 350 includes:

(1) a two dimensional grid 352 including a first set 354 of first filaments 356 and a second set 358 of second filaments 360, wherein the first set 354 of first filaments 356 are aligned in a first direction 362 and the second set 358 of second filaments 360 are aligned in a second direction 364 so as to intersect with the first set 354 of the first filaments 356; and (2) a plurality of pillars 368 extending from the two dimensional grid 352 so that the first set 354 of first filaments 356, second set 358 of second filaments 360, and the plurality of pillars 368 form a three dimensional network.

The method comprises positioning the first tape 350a and the second tape 350b so that a first plurality 366a of the pillars 368 of the first tape 350a hook 1210 onto the second plurality 366b of the pillars 368 in the second tape. In one or more examples, each of a first plurality 366a of the pillars 368 of the first tape 350a hook 1210 onto one of a second plurality 366b of the pillars 368 in the second tape 350b.

The method can be embodied in many ways including, but not limited to:

1. The first component 1050 including a first plurality 1206 of layers 312 (e.g., first layer 312a and second layer 312b) and the second component 1054 including a second plurality 1208 of layers 312 (e.g., first layer 312a and second layer 312b), each of the layers 312 comprising fiber tows 302 (as illustrated in FIG. 12B).

2. The method wherein (as illustrated in FIG. 12B):

a. the pillars 368 include first pillars 368c extending from a first side S1 of the two dimensional grid 352 and/or second pillars 368d extending from a second side S2 (opposite the first side) of the two dimensional grid 352 in each tape 350;

b. the plurality of tapes 350 include a third tape 350c and a fourth tape 350d, the first component 1050 including the third tape 350c and the second component 1054 including the fourth tape 350d;

c. the pillars 368 (first pillars 368c) on a first side S1 in the first tape 350a hook 1210 onto the pillars 368 (second pillars 368d) on a second side S2 of the second tape 350b (e.g., as illustrated in FIGS. 12A and 12B);

d. the pillars 368 (second pillars 366d) on a second side S2 of the first tape 350a pass into or extend towards spaces 310 between the fiber tows 302 in one of the first plurality 1206 of the layers 312 and hook onto the pillars 368 of the third tape 350c, and e. the pillars 368 (first pillars 368c) on a first side S1 of the second tape 350b pass into or extend towards spaces 310 between the fiber tows 302 in one of the second plurality 1208 of the layers 312 and hook onto the pillars 368 of the fourth tape 350d.

In one or more examples, each of the pillars 368 on the first side S1 of the first tape 350a pass into or extend towards different spaces 310 in the first plurality 1206 of layers 312 and/or each of the pillars 368 on the second side S2 of the second tape 350b pass into or extend towards different spaces 310 in the second plurality 1208 of layers 312.

3. The method wherein the second component 1050 comprises a stiffener 1004 and the second component 1054 comprises a skin 1006 in an integrated aircraft structure.

FIGS. 11A-11F, 12A and 12B further illustrate the pillars 368 of adjacent tapes 350 (first tape 350a and second tape 350b) form an entangled pair 369 of pillars 368 comprising a pillar 368 of a first tape 350a twisted with or wrapped around the pillar 368 of a second tape 350b.

Advantages and Improvements

Liquid Molding can be used to rapidly and cost-effectively form performs (e.g., layers of fiber tows) into complex shapes such as wovens, braids and non-crimp fabrics. Preforms shaped into ribs or stiffeners can be combined with other preforms (e.g., shaped into skins) as to form integrated structures. This leads to significant part count and cost reduction at the component assembly stage and/or elimination of fasteners.

However, the interlaminar properties at the interfaces between layers of fiber tows in conventional integrated structures or laminates are poor because toughening is limited to within single planes of the layers of fiber tows. As a result, additional toughening mechanisms are used (fasteners, coarse stitching or film adhesives). For example:

(1) Coarse stitching in the layers of fiber tows are used to increase toughening; however; they may cause microcracking and damage of the fiber tows, leading to a knockdown in in-plane laminate properties.

(2) A physical barrier (e.g., pins) inserted between multiple layers of fiber tows increases toughness by preventing in-plane propagation of cracks and inducing other toughening modes. However, as for coarse stitching, the physical insertion of pins leads to damage of the fiber tows and/or the creation of localized resin rich pockets. These discrepancies lead to a significant knockdown in in-plane properties of the layers of fiber tows.

Figure 1:
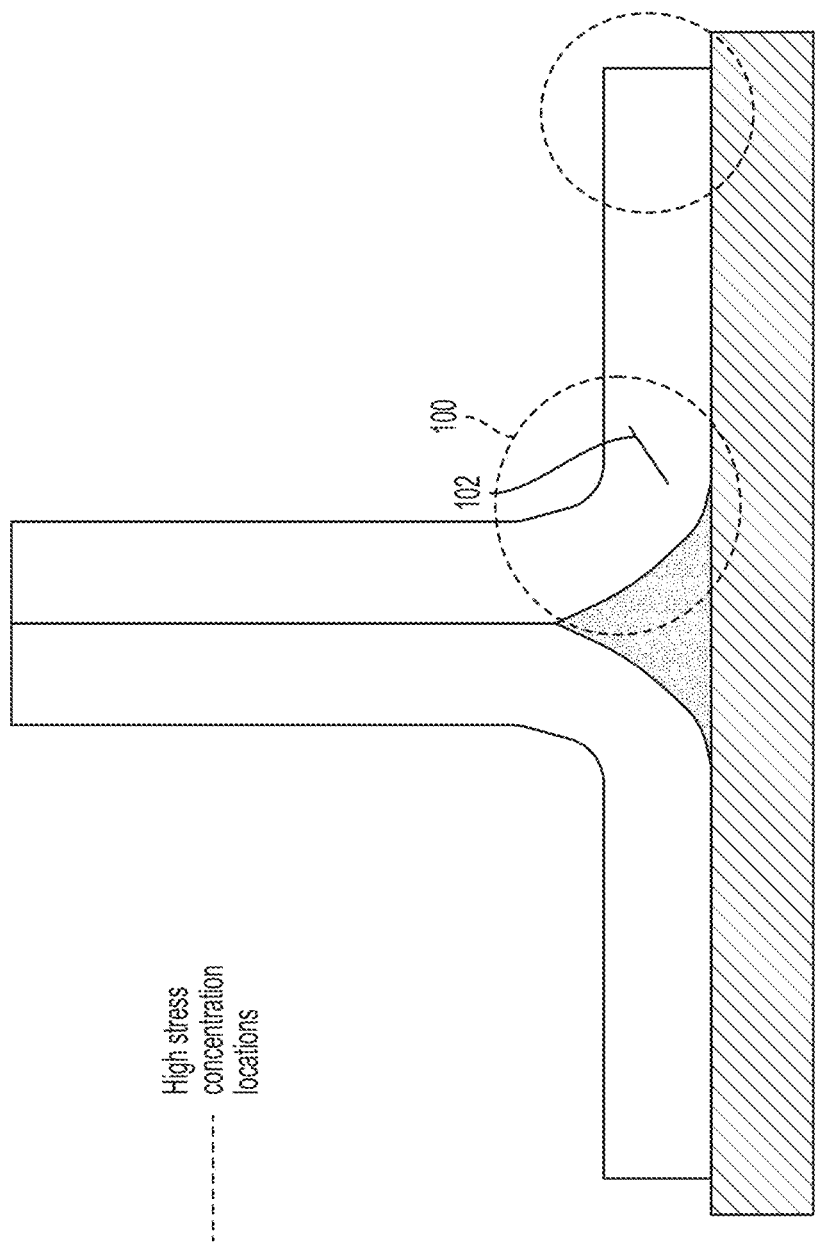
FIG. 1 illustrates high stress concentration regions in a T-Joint including layers of fiber tows.

(3) Film adhesives block the flow of resin during the infusion process, preventing conventional liquid molded veil toughening for high stress locations where out of plane loads are induced, such as the radius or run-off of a T-joint (see FIG. 1). In this case, where peel loads are highest at the run-off between the flange of the stiffener and skin, a crack can readily propagate along the path of least resistance (away from the single layers of a veil introduced between the layers of fiber tows to prevent propagation of cracks) and jump to another non toughened layer of fiber tows.

Figure 2:
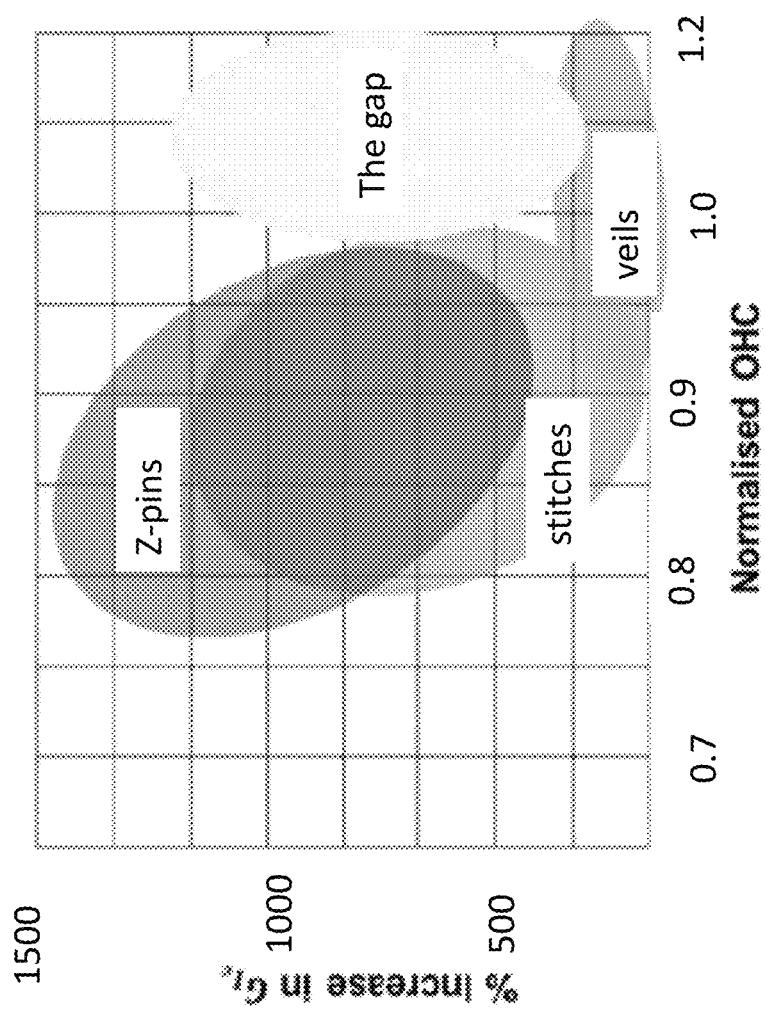
FIG. 2 illustrates the gap representing performance (in terms of achieving fracture toughness and maintaining in-plane properties of layers of fiber tows) that is not achievable in conventional structures.

These toughening mechanism require a trade-off that is not viable for many current applications (e.g., aircraft structures). FIG. 2 illustrates the gap in the market for improving the interlaminar toughness (in-plane and out-of plane properties) of integrated structures, particularly at joints or interfaces between layers of fiber tows (e.g., dry fiber reinforcements) in the integrated structures, and particularly for those structures manufactured using liquid molding processes.

These problems are overcome using various tape embodiments disclosed herein, such as the following.

(i) A tape 350 in a roll format and comprising a permeable veil interlayer 394 that enables transfer of liquid or gases through the thickness of the permeable veil interlayer 394.

(ii) A tape 350 readily applied to multiple layers 312 of fiber tows (disposed in braids, wovens, tapes, non-crimp fabrics).

(iii) A tape 350 readily located at the interface between layers 312 of fiber tows and also between the layers 338a, 312 of fiber tows forming a detailed preform.

(iv) Pillars 368 (e.g., comprising short fibers in the z-plane) of a first tape 350a configured to entangle with other pillars 368 of a second tape when pressed together.

(v) Entangled pillars 368 providing significant toughening through the thickness of a laminate 392 comprising a plurality of layers 312 of fiber tows, without sacrificing in-plane properties of the laminate 392.

(vi) Entangled pillars 368 enabling layers 312 of fiber tows 302 to be held together so as to support the handing, lay up, assembly and stabilization of the layers 312 of fiber tows or preforms including the layers 312.

(vii) A tape readily manufactured using continuous additive manufacturing technology, e.g., so that the three dimensional network 390 enables significant cost reductions in the lay-up of layers of fiber tows and integrated aircraft structures 1000.

(viii) A tape with pillars 368 added as an interlayer during the layup of fiber tows and enabling flexibility in manufacturing (manual or a range of automated deposition techniques).

(ix) The effective entanglement of pillars 368 between layers 312 of fiber tows eliminating the need to use elevated temperatures and devices to bond the layers 312 of fiber tows. For example, the effective entanglement of pillars 368 between layers 312 of fiber tows can be achieved at room temperature ambient conditions common to liquid molding processes (e.g., without high temperatures achieved using lasers or heating devices), thereby minimizing the capital expense of automation and enabling use of lighter weight collaborative robots.

(x) The composite articles 300a, 300b, 300c, and 300d deposited with high deposition rates and using ambient temperature conditions.

(xi) A tape that does not suffer from short shop lifetimes (unlike conventional film adhesives).

(xii) A tape embodiment significantly increasing toughness of the composite so that the composite can be used in integrated structures in high impact damage areas of an aircraft.

Processing Environment

FIG. 13 illustrates an exemplary system 1300 used to implement processing elements needed to control the three dimensional printers (400) described herein.

The computer 1302 comprises a processor 1304 (general purpose processor 1304A and special purpose processor 1304B) and a memory, such as random access memory (RAM) 1306. Generally, the computer 1302 operates under control of an operating system 1308 stored in the memory 1306, and interfaces with the user/other computers to accept inputs and commands (e.g., analog or digital signals) and to present results through an input/output (I/O) module 1310. The computer program application 1312 accesses and manipulates data stored in the memory 1306 of the computer 1302. The operating system 1308 and the computer program application 1312 are comprised of instructions which, when read and executed by the computer 1302, cause the computer 1302 to perform the operations herein described. In one embodiment, instructions implementing the operating system 1308 and the computer program application 1312 are tangibly embodied in the memory 1306, thereby making one or more computer program products or articles of manufacture capable of performing the printing methods described herein (e.g., as described in FIG. 5). As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A tape, comprising:
    a two dimensional grid including a first set of first filaments and a second set of second filaments, wherein the first set of the first filaments are aligned in a first direction and the second set of the second filaments are aligned in a second direction so as to intersect with the first set of the first filaments; and
    a plurality of pillars extending from the two dimensional grid so that the first set of the first filaments, the second set of the second filaments, and the plurality of the pillars form a three dimensional network, wherein each of the pillars are attached at one end to a base and the base is wider than the each of the pillars.

2. The tape of claim 1, wherein the three dimensional network comprises a veil interlayer, the pillars are configured to pass into spaces between a plurality of fiber tows and hook onto pillars extending from a second two dimensional grid in a second tape, so as to join the tape to the second tape and reinforce the fiber tows while reducing or preventing damage to the fiber tows.

3. The tape of claim 1, wherein the three dimensional network is a three dimensional interlayer between layers of a laminate, the pillars are configured to pass into spaces in the laminate and hook onto second pillars extending from a second two dimensional grid in a second tape, so as to join the tape to the second tape and reinforce the laminate while reducing or preventing damage to the laminate.

4. The tape of claim 1, wherein the pillars have a height H in a range of 0.3 mm≤H≤5 mm.

5. The tape of claim 1, wherein the pillars extending from the two dimensional grid have a spacing $S_E$ between adjacent pillars in a range of 0.8 mm≤$S_E$≤5 mm.

6. The tape of claim 1, wherein:
    a spacing $S_h$ between adjacent first filaments in the first set of the first filaments is 0.8 mm≤$S_h$≤5 mm, and
    a spacing $S_v$ between adjacent second filaments in the second set of the second filaments is 0.8 mm≤$S_v$≤5 mm.

7. The tape of claim 1, wherein:
    the pillars have an average diameter $E_d$ in a range 0.02 mm≤$E_d$≤1.0 mm.

8. The tape of claim 1, wherein the first filaments and the second filaments each independently have a diameter d in a range 0.04 mm≤d≤2 mm.

9. The tape of claim 1, wherein the two dimensional grid comprises a mesh including pores bounded by the first filaments and the second filaments, wherein the pores comprise between 40-80% of a surface area of the mesh so as to facilitate resin infusion into the tape.

10. The tape of claim 1, wherein the pillars are inclined at an angle in a range from zero to five degrees, wherein the angle is between a line, passing through a base of one of the pillars and a tip of the one of the pillars, and a direction perpendicular to the two dimensional grid.

11. The tape of claim 1, wherein the pillars extend from intersections between the first filaments and the second filaments.

12. The tape of claim 1, further comprising a plurality of intersections between the first filaments and the second filaments, wherein the pillars extend from the first filaments or the second filaments at a plurality of locations and each of the locations are between the intersections.

13. The tape of claim 1, wherein the pillars are configured to hook onto the pillars extending from a second two dimensional grid in a second tape, so as to join the tape to the second tape.

14. The tape of claim 1, wherein the pillars extend from a first side of the tape and a second side of the tape.

15. The tape of claim 1, wherein each of the pillars comprise drawn material.

16. The tape of claim 1, wherein the first filaments, the second filaments, and/or the pillars comprise a thermoplastic or a hybrid of the thermoplastic.

17. A composite article including the tape of claim 13, further comprising:
   the tape comprising a first tape including:
      a first two dimensional grid including a first set of filaments and a second set of filaments, wherein the first set of filaments are aligned in a first direction and the second set of filaments are aligned in a second direction so as to intersect with the first set of filaments; and
      a first plurality of pillars extending from the first two dimensional grid; and
   the second tape including:
      the second two dimensional grid including a third set of filaments and a fourth set of filaments, wherein the third set of filaments are aligned in a third direction and the fourth set of filaments are aligned in a fourth direction so as to intersect with the third set of the filaments;
      a second plurality of pillars extending from the second two dimensional grid, wherein each of the first plurality of pillars are hooked onto one of the second plurality of pillars.

18. The composite article of claim 17, further comprising a layer of fiber tows between the first tape and the second tape, wherein:
   the first plurality of the pillars extend to a maximum distance from the first two dimensional grid,
   the maximum distance is measured in a direction perpendicular to the first two dimensional grid, and
   the maximum distance is less than a spacing from the first two dimensional grid to a bottom of the layer of the fiber tows closest to the first two dimensional grid.

19. The composite article of claim 17, further comprising a layer of fiber tows between the first tape and the second tape, wherein:
   the first plurality of pillars extend to a maximum distance from the first two dimensional grid,
   the maximum distance is measured in a direction perpendicular to the first two dimensional grid, and
   the maximum distance is equal to a spacing from the first two dimensional grid to a top of the layer furthest from the first two dimensional grid, so that tips of the first plurality of the pillars are even with the top of the layer.

20. The composite article of claim 17, further comprising a layer of fiber tows between the first tape and the second tape, wherein:
   the first plurality of the pillars extend to a maximum distance from the first two dimensional grid,
   the maximum distance is measured in a direction perpendicular to the first two dimensional grid, and
   the maximum distance is greater than a spacing from the first two dimensional grid to a top of the layer furthest from the first two dimensional grid, so that the first plurality of the pillars extend through and above the layer.

21. An integrated aircraft structure comprising the composite article of claim 20, further comprising:
   a skin attached to the first tape;
   a stiffener attached to the second tape; and
   resin filling pores in the first two dimensional grid and the second two dimensional grid.

22. A method of making a composite article, comprising:
   positioning one or more layers, each of the layers comprising fiber tows, between a plurality of tapes including a first tape and a second tape, wherein:
   each tape includes:
      a two dimensional grid including a first set of first filaments and a second set of second filaments, wherein the first set of the first filaments are aligned in a first direction and the second set of the second filaments are aligned in a second direction so as to intersect with the first set of the first filaments;
      a plurality of pillars extending from the two dimensional grid so that the first set of the first filaments, the second set of the second filaments, and the plurality of pillars form a three dimensional network; and wherein:
   the pillars of the first tape:
   pass into spaces between the fiber tows,
   each of the pillars are attached at one end to a base, and
   the base is wider than the each of the pillars.

23. The method of claim 22, wherein the positioning further comprises:
   laying one or more of the layers on the first tape so that the pillars of the first tape pass through the spaces between the fiber tows of the one or more of the layers; and
   positioning the second tape on the one or more layers so that at least some of the pillars of the second tape hook onto portions of the pillars of the first tape that have passed through the spaces.

24. The method of claim 22, further comprising a plurality of the layers and wherein the positioning further comprises:
   sequentially laying each of the plurality of the layers on the first tape so that:
      a plurality of the spaces between the fiber tows in each of the layers are stacked above one another and form a plurality of stacked openings through all the layers, and
      the pillars of the first tape extend through or into the stacked openings; and
   positioning the second tape on the layers so that the pillars of the second tape hook onto portions of the pillars of the first tape that have passed through or into the stacked openings.

25. The method of claim 24, wherein the layers comprise a first layer and a second layer;

the pillars of the first tape have a first length passing into the stacked openings, through the first layer and into the second layer, and the pillars of the second tape have a second length passing into the stacked openings and through the second layer, but the second length is too short to reach the first layer.

26. The method of claim 22, wherein:

the pillars include first pillars and second pillars, the first pillars extend from a first side of the two dimensional grid in the first tape and/or the second tape, and the second pillars extend from a second side of the two dimensional grid in the first tape and/or the second tape.

27. The method of claim 26, wherein the tapes include a third tape, the method further comprising:

positioning an additional layer comprising the fiber tows on the second tape, wherein the second pillars of the second tape comprise the pillars extending towards the one or more layers and the first pillars of the second tape extend towards the additional layer; and laying a third tape on the additional layer so that the second pillars in the third tape hook onto the first pillars extending from the second tape, wherein:

the second pillars in the third tape and/or the first pillars in the second tape pass into or through the spaces between the fiber tows in the additional layer.

28. The method of claim 27, wherein the one or more layers are in a first component of an article of manufacture and the additional layer is in a second component of the article of manufacture.

29. The method of claim 28, wherein the first component is a stiffener of an integrated aircraft structure and the second component is a skin of the integrated aircraft structure.

30. The method of claim 22, further comprising applying resin into each of a plurality of pore spaces between the first filaments, the second filaments, and the pillars in the three dimensional network.

31. A method of making a composite article, comprising:

attaching a plurality of tapes including a first tape and a second tape, wherein:

the first tape is attached to a first component and the second tape is attached to a second component, and each tape includes:

a two dimensional grid including a first set of first filaments and a second set of second filaments, wherein the first set of first filaments are aligned in a first direction and the second set of second filaments are aligned in a second direction so as to intersect with the first set of the first filaments; and a plurality of pillars extending from the two dimensional grid so that the first set of the first filaments, the second set of the second filaments, and the plurality of the pillars form a three dimensional network, wherein each of the pillars are attached at one end to a base and the base is wider than the each of the pillars; and the attaching comprises positioning the first tape and the second tape so that the pillars of the first tape hook onto the pillars in the second tape.

32. The method of claim 31, wherein:

the first component includes a first plurality of layers and the second component includes a second plurality of layers, each of the layers comprising fiber tows.

33. The method of claim 32, wherein:

the pillars include first pillars extending from a first side of the two dimensional grid and second pillars extending from a second side the two dimensional grid, the plurality of tapes include a third tape and a fourth tape, the first component includes the third tape and the second component includes the fourth tape, the first pillars in the first tape hook onto the second pillars of the second tape, the second pillars in the first tape pass into or extend towards spaces between the fiber tows in one of the first plurality of the layers and hook onto the pillars of the third tape, and the first pillars in the second tape pass into or extend towards spaces between the fiber tows in one of the second plurality of the layers and hook onto the pillars of the fourth tape.

34. The method of claim 31, wherein the first component is a stiffener and the second component is a skin in an integrated aircraft structure.

* * * * *